U S010958874B2

(12) United States Patent
Astarabadi et al.

(10) Patent No.: US 10,958,874 B2
(45) Date of Patent: Mar. 23, 2021

(54) VIDEO CONFERENCING METHOD

(71) Applicant: Present Communications, Inc., Redwood City, CA (US)

(72) Inventors: Yousif Astarabadi, Redwood City, CA (US); Matt Mireles, Redwood City, CA (US); Shaun Astarabadi, Redwood City, CA (US)

(73) Assignee: Present Communications, Inc., Redwood City, CA (US)

( * ) Notice: Subject to any disclaimer, the term of this patent is extended or adjusted under 35 U.S.C. 154(b) by 0 days.

(21) Appl. No.: 16/870,010

(22) Filed: May 8, 2020

(65) Prior Publication Data
US 2020/0358983 A1 Nov. 12, 2020

Related U.S. Application Data

(60) Provisional application No. 62/845,781, filed on May 9, 2019.

(51) Int. Cl.
| H04N 7/15 | (2006.01) |
| G06K 9/00 | (2006.01) |
| G06T 7/73 | (2017.01) |
| G06T 7/246 | (2017.01) |
| G06T 17/20 | (2006.01) |
| G10L 19/16 | (2013.01) |

(52) U.S. Cl.
CPC ......... *H04N 7/157* (2013.01); *G06K 9/00255* (2013.01); *G06K 9/00281* (2013.01); *G06K 9/00288* (2013.01); *G06K 9/00362* (2013.01); *G06T 7/246* (2017.01); *G06T 7/73* (2017.01); *G06T 17/20* (2013.01); *G10L 19/167* (2013.01); *G06T 2200/24* (2013.01); *G06T 2207/10016* (2013.01); *G06T 2207/30201* (2013.01)

(58) Field of Classification Search
CPC ............... H04N 7/157; G06K 9/00362; G06K 9/00288; G06K 9/00281; G06K 9/00255; G06T 7/73; G06T 17/20; G06T 7/246; G06T 2207/30201; G06T 2200/24; G06T 2207/10016; G10L 19/167
See application file for complete search history.

(56) References Cited

U.S. PATENT DOCUMENTS 9,813,666 B2 * 11/2017 Law ........................ G06T 9/20
2006/0215016 A1 * 9/2006 Cohen .................... H04N 7/148
348/14.12

(Continued)

*Primary Examiner* — Stella L. Woo
(74) *Attorney, Agent, or Firm* — Run8 Patent Group, LLC; Peter Miller

(57) ABSTRACT

One variation of a method for video conferencing includes, at a first device associated with a first user: capturing a first video feed; representing constellations of facial landmarks, detected in the first video feed, in a first feed of facial landmark containers; and transmitting the first feed of facial landmark containers to a second device. The method further includes, at the second device associated with a second user: accessing a first face model representing facial characteristics of the first user; accessing a synthetic face generator; transforming the first feed of facial landmark containers and the first face model into a first feed of synthetic face images according to the synthetic face generator; and rendering the first feed of synthetic face images.

22 Claims, 7 Drawing Sheets

(56) References Cited

U.S. PATENT DOCUMENTS

| | | | |
|---|---|---|---|
| 2012/0236105 A1* | 9/2012 | Alberth | H04N 7/147 |
| | | | 348/14.07 |
| 2014/0016696 A1* | 1/2014 | Nelson | H04N 19/105 |
| | | | 375/240.12 |
| 2014/0026157 A1* | 1/2014 | Wang | H04N 21/25875 |
| | | | 725/12 |
| 2014/0192136 A1* | 7/2014 | Yu | H04L 12/1813 |
| | | | 348/14.03 |
| 2015/0042743 A1* | 2/2015 | Cullen | G06K 9/00315 |
| | | | 348/14.02 |
| 2019/0222807 A1* | 7/2019 | Rivard | H04L 51/04 |
| 2020/0020172 A1* | 1/2020 | Rogers | G06T 15/08 |
| 2020/0065559 A1* | 2/2020 | Vats | G06K 9/00228 |

\* cited by examiner

VIDEO CONFERENCING METHOD

CROSS-REFERENCE TO RELATED APPLICATIONS

This application claims the benefit of U.S. Provisional Application No. 62/845,781, filed on 9 May 2019, which is incorporated in its entirety by this reference.

TECHNICAL FIELD

This invention relates generally to the field of video conferencing and more specifically to a new and useful method for synthetic video reconstruction in the field of video conferencing.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. First Method

Figure 1:
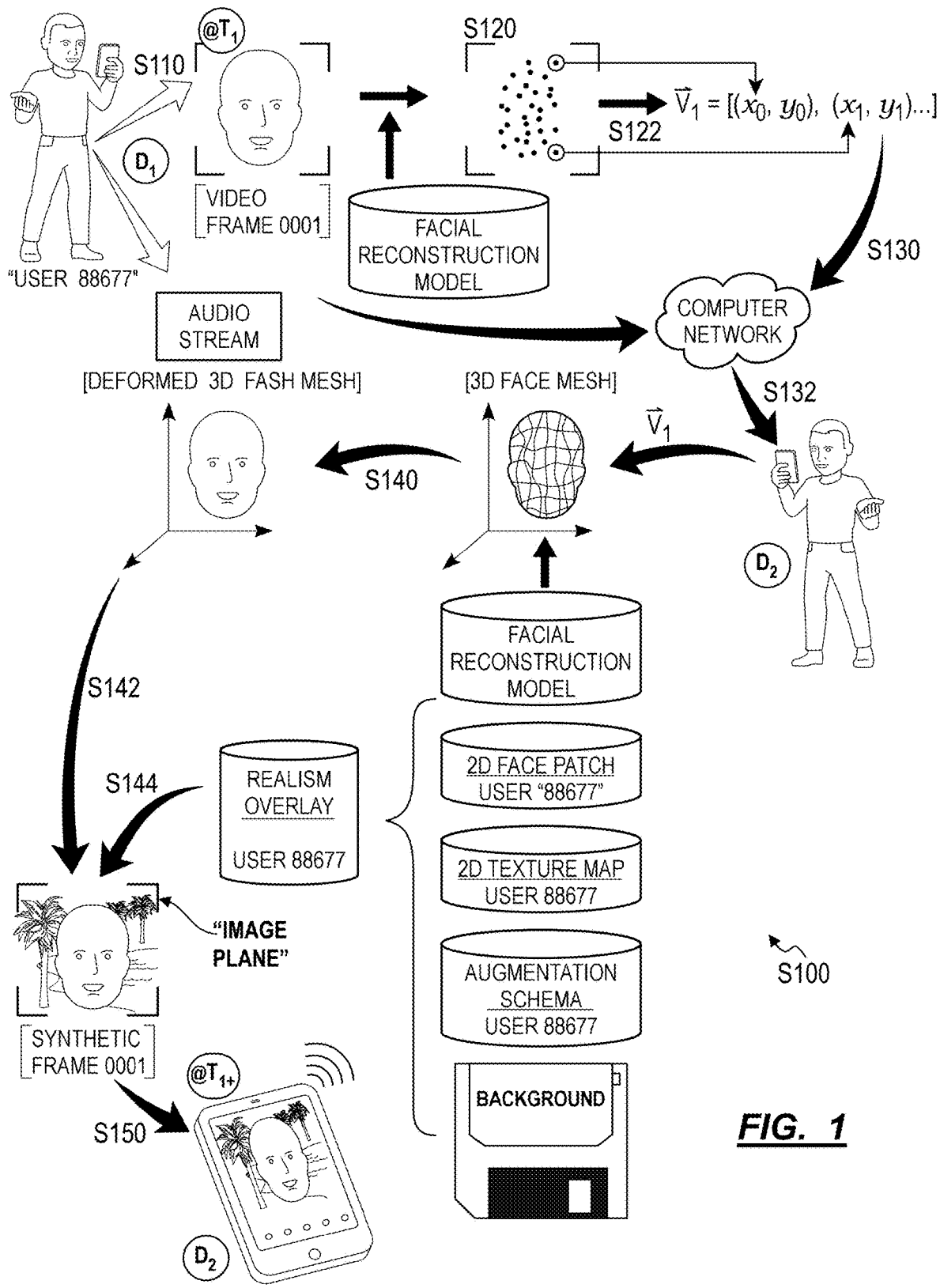
FIG. 1 is a flowchart representation of a first method.

As shown in FIG. 1, a first method S100 for video conferencing includes, at a first device associated with a first user: recording a first sequence of video frames in Block S110; for a first video frame, in the first sequence of video frames, recorded at alignment feature first time, detecting a first constellation of facial landmarks in the first video frame in Block S120 and storing locations of the first constellation of facial landmarks in a first container in Block S122; and transmitting the first container and a first audio packet, recorded at approximately the first time, to a second device in Block S130. The first method S100 also includes, at the second device associated with a second user: receiving the first container and the first audio packet in Block S132; deforming a face reconstruction model into alignment with locations of the first constellation of facial landmarks in the first container to generate a deformed 3D face mesh depicting the first user in Block S140; projecting the deformed 3D face mesh onto an image plane to generate a first synthetic video frame depicting the first user in Block S142; populating the first synthetic video frame with a background image in Block S144; and rendering the first synthetic video frame and outputting the first audio packet at approximately the first time in Block S150.

1.1 Applications

Generally, Blocks of the first method S100 can be executed by native or browser-based applications executing on two devices (e.g., smartphones, tablets, laptop computers) during a video call between two users in order: to compress video frames of a first user into lightweight constellations of facial landmarks at the first device; and to reconstruct these video frames at the second device by injecting these constellations of facial landmarks into a face reconstruction model to generate a synthetic photorealistic depiction of the first user before rendering these synthetic video frames for a second user at the second device. Simultaneously, the second device can compress video frames of the second user into lightweight constellations of facial landmarks; and the first device can reconstruct these video frames by injecting these constellations of facial landmarks into the same face reconstruction model to generate a synthetic photorealistic depiction of the second user before rendering these synthetic video frames for the first user at the first device.

In particular, rather than transmit and receive data-rich video feeds during a video call, a first device executing the first method S100 can instead extract facial landmark constellations from a video feed and transmit a feed of facial landmark constellations to a second device. The second device can then leverage a local model—such as a generic model or a model specific to the first user—to reconstruct a photorealistic representation of the first user's face and then render this photorealistic synthetic video feed in near real-time. The second user may thus experience the video call as though a color video was received from the first user's device but without necessitating a high-bandwidth, low-latency data connection between the first and second devices. The second and first devices can concurrently execute the same process in reverse to extract facial landmark constellations from a second video feed recorded at the second device, to transmit this second feed of facial landmark constellations to the first device, and to leverage a local model to reconstruct a photorealistic synthetic video feed of the second user. More specifically, by extracting facial landmark constellations from a high-definition video feed according to the method S100, the first device can compress this high-definition video feed by multiple orders of magnitude (e.g., by approximately 100 times). Transmission of a feed of facial landmark constellations—at the same frame rate as the original high-definition video (e.g., 24 frames per second)—from the first device to the second device during a video call may therefore require significantly less bandwidth than the original high-definition video (e.g., 10 kilobits per second rather than 1.5 Megabits per second). Therefore, the first method S100 can enable a high-quality video call with significantly less upload bandwidth to transmit a representation of a first video from the first device to a computer network and significantly less download bandwidth required to download this representation of the first video to the second device, and vice versa.

Furthermore, humans may perceive audible and visual events temporally offset by up to 200 milliseconds as occurring concurrently. However, the first and second devices can execute Blocks of the first method S100 to extract a facial landmark constellation from a video frame at a first device, transmit this facial landmark constellation to a computer network, download this facial landmark constellation at the second device, inject this facial landmark constellation into a local face reconstruction model at the second device to generate a synthetic video frame, generate a realism overlay (e.g., containing lighting, color, texture, and augmentation content) for the synthetic frame, and render the synthetic frame with the realism overlay on a display at the second device in a relatively short period of time (e.g., less than 200 milliseconds). Generally, because the first device compresses a video feed (e.g., by orders of magnitude) into a stream of facial landmark containers (e.g., in the form of a vector containing 68 (x,y) or (x,y,z) coordinates for 68 predefined facial landmarks), packet size for facial landmark containers transmitted from the first device to the second device may be relatively very small. Therefore, throughput requirements to transmit this stream of facial landmark containers between the first and second devices over wireless and local area networks may be significantly less than actual throughputs supported by these networks. More specifically, transmission of this lightweight stream of facial landmark containers from the first device to the second device may represent a relatively small portion of the total duration of time from capture of a video frame at the first device to reconstruction and rendering of a corresponding synthetic video frame at the second device. Accordingly, this stream of facial landmark containers may not (or may very rarely) approach throughput limitations of these networks, thereby enabling these networks to transmit this lightweight stream of facial landmark containers from the first device to the second device with low latency, low packet loss, and high consistency despite changes in traffic between other devices connected to these networks and even during periods of high traffic on these networks.

For example, because the stream of facial landmark containers generated from a video feed at the first device contains such a low density of data (e.g., less than 300 bits per video frame at a frame rate of 24 frames per second for a maximum required throughput of 7.2 kilobits per second), the first device can transmit both an audio stream and the stream of facial landmark containers over an analog telecommunication network (which may support a maximum data rate of 33.6 kilobits per second) with sufficient headroom for (occasional) transmission of texture, color, and background data from the first device to the second device. Therefore, the first and second device can execute Blocks of the first method S100 to support a high-resolution video call even over a low bandwidth network, such as an analog network.

The first and second devices can thus execute Blocks of the first method S100 to significantly reduce effects of network throughput limitations on video calls by transmitting and receiving facial landmark data rather than raw or compressed video frames. The first and second devices can also implement facial deconstruction and facial reconstruction models—such as trained on a population of users or the first user specifically based on deep learning or artificial intelligence techniques—to rapidly decompose a first video feed recorded at the first device into a first facial landmark feed and to reconstruct this first facial landmark feed into a first synthetic—but photorealistic—video depicting highest-import content from the first video feed (i.e., the first user's face). Because the first and second devices cooperate to generate this first synthetic video at the second device within such a short duration of time during this video call, the second user viewing the first synthetic video feed at the second device may not perceive a delay or other discontinuity between this first synthetic video feed rendered on the second device and a live audio stream—received from the first device—output by the second device during this video call.

Furthermore, the first device can enable the first user to elect or customize other synthetic content rendered with a synthetic reconstruction of her face at the second device, such as including: a custom background that differs from the first user's true environment during the video call; or makeup, facial hair schema, hair style, clothing and/or accessory schema that differ from the first user's true appearance during the video call. The second device can then incorporate this synthetic content elected by the first user into the first synthetic video feed during the video call, thereby enabling the first user to control how she is presented to the second user.

Therefore, the first and second devices can execute Blocks of the first method S100 to host a low-bandwidth, low-latency, high-quality, photorealistic video call between two users in which both users possess a high degree of individual control over how they are visually presented to the other user.

The first method S100 is described herein as executed by instances of a video conferencing application (hereinafter the "application"), such as a native video conferencing application or a browser application operable within a web browser executing on a computing device, such as a smartphone, tablet, or laptop computer. Furthermore, the first method S100 is described herein as including generation of facial landmark containers from a first live video feed of first user recorded at a first device, transmission of facial landmark containers to a second device, and reconstruction and rendering of a photorealistic, synthetic representation of the first video feed at a second device for viewing by a second user. However, the first and second devices can simultaneously execute this same method in both directions, including: generating facial landmark containers from a second live video feed of the second user at the second device; transmitting facial landmark containers to the first device; and reconstructing and rendering a photorealistic, synthetic representation of the second video feed at the first device for viewing by the first user.

Furthermore, the first method S100 is described herein as implemented by consumer devices to host a two-way video call between two users. However, the first method S100 can be similarly implemented by a device to host one-way live video distribution or asynchronous video replay.

1.2 Global Face Deconstruction/Reconstruction Models

The second device can leverage a local copy of a generic face reconstruction model to transform facial landmark containers received from the first device into a 2D or 3D synthetic representation of the first user's face in a corresponding video frame recorded by the first device. In one implementation, the generic face reconstruction model: defines a 3D face mesh (e.g., a triangular mesh) of a generic human face; and includes a set of (e.g., 68) landmark nodes (or elements)—linked to specific facial landmarks—distributed throughout the 3D face mesh. Thus, when a constellation of (e.g., 68) facial landmark locations of a first user's face—extracted from an original video frame—are fed into the generic face reconstruction model, the generic face reconstruction model can deform the 3D face mesh to align each landmark node with the location of the corresponding facial landmark of the first user's face. This deformed 3D face mesh may thus approximate the shape of the first user's unique face in a position and orientation that corresponds to the real position and orientation of the user's face in the original video frame.

The generic face reconstruction model can be paired with a complementary generic face deconstruction model configured to: ingest a video frame; detect a face in the video frame; detect facial landmarks on the face; extract coordinates (e.g., 2D or 3D coordinates) of each visible facial landmark on the face; and generate a landmark container (e.g., a vector, a list, a matrix) of the coordinates of each visible facial landmark (and flags for obfuscated/occluded facial landmarks or facial landmarks not otherwise visible in the video frame).

In one example, a computer system (e.g., a remote computer cluster) trains the generic face reconstruction model by ingesting a training set of many (e.g., thousands) video clips or static images of human faces and implementing computer vision, deep learning, artificial intelligence, and/or other techniques to: derive a set of facial landmarks that characterize (or "fingerprint") unique human faces; generate the 3D face mesh; link landmark nodes in the 3D face mesh to these facial landmarks; and define parameters for smoothing transitions between elements in a deformed 3D face mesh. The computer system can also train the complementary generic face deconstruction model—that extracts facial landmarks from video frames—based on this same training set of video clips or static images of human faces.

Therefore, the first device can implement a local copy of the generic face deconstruction model to detect a specific set of facial parameters (e.g. landmarks) on the first user's face in a first video frame and to generate a first landmark container representing locations of these facial landmarks detected in the first video frame. The second device can then implement a local copy of the generic face reconstruction model to generate a (3D or 2D) representation of the geometry, position, and location of the first user's face—depicted in the first video frame—by deforming the 3D face mesh according to facial landmarks represented in the first landmark container.

1.3 Realism Extractor/Generator

Similarly, the first device can implement a local copy of a realism extractor to extract additional information from a video frame, and the second device can implement a local copy of a complementary realism generator to augment a deformed 3D face mesh with this additional information to augment perceived realism of the resulting synthetic video frame.

In one implementation, the realism extractor: ingests a video frame; detects a face in the video frame; detects textures (e.g., facial hair, head hair, smooth skin, wrinkles, acne, lips, eyes) in regions throughout the face; and generates a texture container (e.g., a vector, a list, a matrix) of the texture types in each region of the face detected in the video frame. For example, the realism extractor includes a generic 2D face representation defining discrete regions of interest for textures on a human head, such as: top of head; forehead; eyebrows; eye sockets; temples; upper cheeks; lower cheeks; nose; philtrum; lips; chin boss; and jaw lines. In this example, the realism extractor can: deform the generic 2D or 3D face representation into alignment with a face detected in a video frame; project boundaries of discrete regions of interest from the deformed 2D or 3D face representation onto the face detected in the video frame; and implement texture recognition techniques to identify type and magnitude of a primary texture (and a secondary texture, etc.) in each region of interest on the face detected in the video frame, such as by implementing template matching techniques to match features in a region of interest in the video frame to a particular known texture type. In this example, the realism extractor can then: generate a separate texture container (e.g., a vector, a list, a matrix) containing values representing a texture type and magnitude identified in each region of interest in the video frame; or append the corresponding facial landmark container with values representing the texture type and magnitude thus identified in each region of interest in the video frame.

In this implementation, the complementary realism generator can similarly include a generic 2D texture patch depicting the same regions of interest defined by the 2D or 3D face representation in the realism extractor. Upon receipt of a texture container (or facial landmark container), the realism generator can populate each region in the generic 2D texture patch with a texture representation for the texture type(s) indicated in the texture container (or facial landmark container) for this region of interest. For example, the realism generator can: populate each region in the 2D texture patch with a bump map for a type of the texture assigned to the region; adjust opacity of the bump map projected into each region in the 2D texture patch based on the magnitude of the corresponding texture indicated in the texture container; and then smooth bump maps between adjacent regions in the 2D texture patch.

Like the face reconstruction and deconstruction models, the computer system can train the realism extractor and complementary realism generator based on a training set of many (e.g., thousands) video clips or static images of human faces, such as annotated with different texture types and magnitudes. The computer system can also develop and refine definitions for regions of interest in the generic 2D face representation described above, such as based on facial regions that exhibit greatest variance and similarities across the training set.

The realism generator can also include lighting models for illuminating a generic or deformed 3D face mesh in the generic face reconstruction model, such as diffuse, overhead, and directional lighting models. As described below the realism generator can further include accessory, makeup, grooming, jewelry, and/or clothing models, etc. for augmenting a synthetic video frame with synthetic, visual representations of accessories, makeup schemes, grooming schemes, accessories, and/or clothing etc., such as described below.

1.4 Onboarding and User Profile

Prior to initiating a video call between a first user at the first device and a second user at the second device, the a first and second instance of the application, local copies of the generic face deconstruction and reconstruction models, and the realism extractor and generator can be loaded onto the first and second devices. For example, a first instance of the application can load these models onto the first device when the application is first installed on the first device, and the first device can store these models in local memory to support future video calls with other devices.

The first instance of the application can also initialize a user profile for the first user, generate a color map of the user's face, and store this color map in the first user's profile. For example, the first instance of the application can: render a phrase, sentence, paragraph, or other text prompt on the first device; prompt the user to recite the rendered text while facing a forward-facing camera on the first device; record a video segment of the first user reciting the prompt (e.g., over a period of approximately 30 seconds) and/or exhibiting different facial expressions according to the prompt; generate a 2D color patch (e.g., a flat color map or a set of 2D color patches) of the user's face (e.g., with eyes open and mouth closed) based on this video segment; implement the generic face deconstruction model to detect the set of facial landmarks in the 2D color patch; link the set of facial landmarks in the 2D color patch to corresponding facial landmarks in the generic face reconstruction model; and store the 2D color patch with facial landmark annotations in the first user's profile. (The first instance of the application can also generate and store secondary 2D color patch layers depicting the user's eyes closed and/or mouth open, etc. in the first user's profile.)

Over time, the first instance of the application (or the remote computer system) can implement similar methods and techniques to update an existing 2D color patch of the user's face or to generate additional 2D color patches of the user's face, such as automatically when the user opens the application or when manually triggered by the user. For example, the user may manually trigger the application to generate additional 2D color patches: after a haircut; after shaving; after growing a beard; after changing hair color; after switching from glasses to contacts or when wearing different glasses; when wearing different hats; when wearing different garments (e.g., a suit and tie, business causal dress, casual dress, beachwear, athletic wear, and/or sleepwear); when wearing different makeup schema; and/or when wearing different hair styles. The application can thus: generate 2D color patches depicting the user in these different conditions; and store these 2D color patches—associated with different user conditions—in the user's profile. For example, the first instance of the application can store a 2D color patch "library" for the first user and enable the first user to select a particular 2D color patch—from this library—to serve to another device for generation of synthetic video frames at this other device during a next video call.

Additionally or alternatively, the first instance of the application can execute the foregoing process in real-time during an initial segment of a video call (e.g., a first 30 seconds of a video call) at the user's device to generate a 2D color patch for the user. For example, during a video call between the first device and the second device, the first instance of the application can: record a sequence of video frames during first 30 seconds of a video call; stream raw or compressed video frames—rather than facial landmark containers—to the second device during this initial period of the video call; implement foregoing methods and techniques to construct a 2D color patch for the first user based on this initial sequence of video frames; transmit this 2D color patch of the first user to the second device; and then transition to generating and transmitting facial landmark containers—rather than raw or compressed video frames—to the second device for reconstruction into a synthetic video feed according to methods and techniques described below.

1.5 Video Call Initialization and Configuration

To initialize a video call with the second user, the first user may: open the application; select the second user from a contact list; and then configure her video feed—as described below—prior to triggering the first device to call and connect to the second device associated with the second user.

In one implementation, after initializing the video call with the second user, the first user may configure features of her first video feed for reconstruction at the second device. For example, the first user may select a particular 2D color patch from a set of existing 2D color patches stored in the user's profile or elect generation of a new 2D color patch from a video clip recorded just before the upcoming video call or during an initial period of this upcoming video call, as described above. Accordingly, the first instance of the application can upload this 2D color patch to the second device or trigger the second device to retrieve this 2D color patch from a remote database.

The first instance of the application can also prompt the first user to select or activate augmentation schema, such as: a virtual accessory schema (e.g., glasses); a virtual makeup schema (e.g., lipstick, blush, eyeliner, eyelashes); a virtual grooming schema (e.g., eyebrow profiles, beard profiles, haircuts and styles); a virtual jewelry schema (e.g., earrings, a nose ring, a lip ring); and/or virtual clothing schema (e.g., a suit and tie, business causal dress, casual dress, beachwear, athletic wear, sleepwear). The first instance of the application can then return a command to the second device to inject virtual representations of glasses, makeup schema, etc.—thus selected by the user—into the synthetic video feed generated at the second device during the upcoming video call. Similarly, the first instance of the application can prompt the first user to select from: a live background detected behind the user during the current or upcoming video call; a past background detected behind the user during a past video call; and a set of generic backgrounds (e.g., a white background, a beach scene, a conference room scene, a coffee shop scene, an office scene). If the first user selects a live background, the first instance of the application can record one or a short sequence of video frames before or during the first period of the video call, extract the background from these video frames, implement deep learning or artificial intelligence to fill in a region of the background obscured by the user's head, and transmit this background to the second device for integration as the background of synthetic frames generated at the second device during this video call. (The first instance of the application can also store this background in a background library in the first user's profile.) Alternatively, the first instance of the application can prompt the second device to access a prerecorded user-specific background, a copy of a generic background, or a blurred background selected by the first user. The first instance of the application can similarly prompt the first user to select a lighting scheme (e.g., diffuse, overhead, or directional lighting) or select a lighting scheme based on the background selected by the user and then trigger the second device to load this lighting model for the upcoming video call accordingly.

In one variation, the first instance of the application also enables the user to select a binary option to adjust her gaze—depicted in a synthetic video feed generated at the second device—to align with a center of the display of the second device such that the second user perceives that the first user is looking directly at the second user during this video call. More specifically, an offset between a camera and a display at the first device may yield misalignment between the first user's gaze depicted in a raw video feed—and thus the resulting synthetic video feed rendered at the second device—and the position of a second user viewing the synthetic video feed at the second device. Because the second device generates a synthetic representation of the first user's face during this video call, the second device can adjust this synthetic representation to depict the first user looking directly at the second user; the first instance of the application can thus enable the first user to elect this option before or during the video call.

1.5.1 Reality Deviation Examples

Therefore, the first instance of the application can enable the first user to select a 2D color patch, background, and lighting schema and to selectively activate accessory, makeup, grooming, clothing schema, jewelry, and/or other augmentation schema for the video call, thereby providing the user a high level of control over how she is visually presented to the second user at the second device during this video call. For example, the user may still be wearing her pajamas at home as she prepares for a business video call. However, she may elect work-appropriate makeup, jewelry, grooming schema, activate a business-casual clothing schema, and activate a conference room background with diffuse lighting scheme before entering the conference call.

A second device (and other devices) connected to a video call with the user's device may thus access or download these schema and apply these schema to synthetic video frames generated based on facial landmark containers received from the user's device during this video call such that a second user at the second device (and users at other devices) perceive the user as fully dressed, groomed, and working in a professional setting.

In another example, when entering a video call with his grandmother, the user may elect a 2D color patch generated when the user last shaved his face such that his grandmother's second device generates and renders synthetic video frames depicting the user as clean-shaven for his grandmother. However, when entering a video call with a close friend, the user may instead prompt the application to generate a new, current 2D color patch for the user based on a short video sequence recorded just before or just after start of this video call such that a third device carried by the user's close friend generates and renders synthetic video frames depicting the user in his current condition.

Therefore, the application can enable the user to select these 2D color profiles, schema, and background to match his/her audience and/or to improve the user's confidence when engaging in video calls with others. The user may also preconfigure her profile to associate various 2D color profiles, schema, and background combinations (or "looks") with specific contacts, and the first device can interface with devices associated with these other contacts to depict the first user according to these looks.

(Furthermore, because the application transmits a feed of facial landmark containers rather than raw or compressed video frames to a second device during a video call, data depicting anything other than the user's prescribed 2D color profile, schema, and background may be withheld from the second device, thereby preventing the second device from reconstructing synthetic frames that depict information not authorized for transmission by the user (e.g., the user's true appearance or background) and thus preserving the user's control over how she is presented at the second device during this video call.)

1.6 Video Call Activation

When the first user initializes a video call with the second user, the first device can transmit a notification of the requested video call to the second device. If accepted by the second user at the second device, the second instance of the application at the second device can implement the foregoing methods and techniques to configure generation of a synthetic video feed depicting the second user at the first device. Then, once the first user's selected 2D color profile, schema, and background are transmitted from the first device to the second device or otherwise accessed by the second device (e.g., retrieved from a remote database or from local memory)—and vice versa for the second user's selected 2D color profile, schema, and background—the first and second devices can automatically activate and connect to this video call. Once the video call is active, the first device can generate and transmit a facial landmark container feed to the second device, and the second device can combine this facial landmark container feed, 2D color profile, schema, and background selected by the first user into a first synthetic video feed depicting the first user (in her preferred format and setting) and render this first synthetic video for the second user; and vice versa (if the second user has enabled video at the second device).

Alternatively, the first instance of the application can initialize a voice call between the first and second devices when the first user selects the second user at the first instance of the application but initially activate audio transmission only between these two devices. The first instance of the application can then: prompt the first user to select a 2D color profile, augmentation schema, and background or initialize a default 2D color profile, augmentation schema, and background combination previously configured for the second user by the first user; and transmit these data to the second device or otherwise trigger the second instance of the application to access these data. Once the second instance of the application accesses these data, the first instance of the application can notify the first user that video conferencing is now available and prompt the first user to activate a video feed accordingly. Once a video feed is thus activated by the first user, the first instance of the application can capture a first video feed, extract facial landmarks from video frames in this first video feed, and transmit a first facial landmark container feed to the second device in (near) real-time. The second device can then combine this first facial landmark container feed with a 2D color profile, schema, and background selected by the first user into a first synthetic video feed depicting the first user (in her preferred format and setting) and render this first synthetic video for the second user in (near) real-time, as described below. Similarly, once video is activated at the second device, the second instance of the application can capture a second video feed, extract facial landmarks from video frames in this second video feed, and stream a second facial landmark container feed to the first device in (near) real-time. The first device can then combine this second facial landmark container feed and 2D color profile, schema, and background selected by the second user into a second synthetic video feed depicting the second user (in her preferred format and setting) and render this second synthetic video for the first user in (near) real-time.

1.7 Facial Landmark Container Generation and Transmission

Thus, once the first user activates her video feed at the first device, the first instance of the application can: trigger a camera in the first device to record a video feed; access a first video frame recorded by the camera at a first time; implement a local copy of the generic face deconstruction model to extract a first set of facial landmarks from the first video frame; implement a local copy of the realism extractor to extract a first set of texture values from the first video frame; generate a first facial landmark container containing the first set of facial landmarks and the first set of texture values (or a first facial landmark container and a separate texture container); and upload the first facial landmark container to a remote computer system (e.g., a remote server), such as within 20 milliseconds of recordation of the first video frame by the camera. The remote computer system can then distribute the first facial landmark container to the second device for reconstruction into a first synthetic video frame.

The first instance of the application can repeat this process for each subsequent video frame recorded by the camera during this video call or until the first user disables video at the first device.

1.8 Facial Reconstruction and Realism Overlay

Upon receipt of the first facial landmark container, the second instance of the application executing on the second device can: extract the first set of facial landmarks from the first facial landmark container; and inject these facial landmarks into the generic face reconstruction model to generate a first 3D face mesh depicting the first user's face—including her head shape, mouth position, eye and eyelid positions, and head orientation relative to the first device, etc.—at the first time. In particular, the generic face reconstruction model can deform the generic 3D face mesh to align generic facial landmarks in the generic 3D face mesh with facial landmarks extracted from the first facial landmark container received from the first device to generate the first 3D face mesh.

The second instance of the application can also extract texture values from the facial landmark container and then implement the realism generator to transform these texture values into a 2D texture layer as described above. For example, the second instance of the application can: retrieve a generic 2D texture patch depicting regions of interest corresponding to texture values extracted from the facial landmark container; project these texture types corresponding to these texture values into corresponding regions in the generic 2D texture patch; populate each region in the 2D texture patch with a texture representation (e.g., a bump map) for the texture type(s) thus written to these regions; adjust opacity of the texture representation projected into each region in the 2D texture patch based on a magnitude of the texture contained in the corresponding texture value; and smooth these texture representations between adjacent regions in the 2D texture patch. The second instance of the application can then: fit the 2D texture patch to the 2D color patch by deforming the 2D texture patch to align facial landmarks stored in the 2D texture patch with facial landmarks stored in the 2D color patch of the first user.

The second instance of the application can similarly: project or activate makeup, jewelry, facial hair (or smooth-shaven skin), a head hair or hair style, and/or other schema elected by the first user for the video call within a generic 2D augmentation patch; and fit the 2D augmentation patch to the 2D color and texture patches by deforming the 2D augmentation patch to align facial landmarks stored in the 2D augmentation patch with facial landmarks stored in the 2D color and texture patches of the first user.

The second instance of the application can combine the 2D color, texture, and augmentation patches—thus aligned by facial landmarks—to generate one realism overlay and then project this realism overlay onto the first 3D face mesh generated based on facial landmarks extracted from the first video frame at the first device. For example, the second instance of the application can stretch and wrap the realism overlay around the first 3D face mesh such that facial landmarks defined in the realism overlay align with facial landmarks defined in the first 3D face mesh in order to generate a first colorized, texturized, and augmented 3D face mesh depicting the first user's face.

1.9 Lighting

The second instance of the application can then implement the lighting model selected by the second user to illuminate the first colorized, texturized, and augmented 3D face mesh.

1.10 3D to 2D Projection

The second instance of the application can then project the first illuminated, colorized, texturized, and augmented 3D face mesh onto an image plane (e.g., representing a plane of the display in the second device) to form a first 2D color representation of the first user's face, including lighting, color, texture, and augmentation information.

1.11 Background and Rendering

The second instance of the application can then: retrieve the background selected by the user; locate the first 2D color representation of the first user's face over the background to generate a first synthetic frame; and then render this first synthetic frame on the display of the second device.

Simultaneously, the second device can output an audio stream received from the first device such that an audio snippet and this first synthetic video frame are output in approximate synchronicity at the second device.

1.12 Next Video Frame

Responsive to the first device recording a next video frame of the first user, the first and second instances of the application can repeat the foregoing methods and techniques to generate a new texture container, construct a new 2D texture patch, implement this new 2D texture patch to generate a new realism overlay, and generate a next synthetic video frame based on this new realism overlay.

In another implementation, the second instance of the application can store the realism overlay thus generated for the first video and can implement this same realism overlay to generate each subsequent synthetic video frame during this video call; accordingly, the first instance of the application can cease extracting and serving texture values to the second device during the remainder of this video call.

In yet another implementation, the first instance of the application (or the remote computer system) can implement the foregoing methods and techniques to generate a realism overlay for the first user before or during an initial period of the video call and can then transmit this realism overlay to the second device for subsequent generation of synthetic video frames—depicting the first user—at the second device. Similarly, the first of the application (or the remote computer system) can implement these methods and techniques to generate the realism overlay during an earlier video call and can store this realism overlay in the user's profile; if elected by the first user for this video call, the second device can load and implement this realism overlay to generate synthetic video frames—depicting the first user—during this video call.

The second instance of the application can then implement the foregoing methods and techniques to: generate a next 3D face mesh of the first user's face based on facial landmarks extracted from a next video frame at the first device; merge this stored realism overlay with a next deformed 3D face mesh to generate a next colorized, texturized, and augmented 3D face mesh depicting the first user's face; illuminate this next colorized, texturized, and augmented 3D face mesh of the first user's face based on the lighting model selected by the first user; project this next illuminated, colorized, texturized, and augmented 3D face mesh on to the image plane; locate the resulting synthetic representation of the user's face over the background; and render this next synthetic video frame on the second device's display.

Alternatively, the second instance of the application (or the first instance of the application, the remote computer system) can fuse the stored realism overlay from the first video frame during the current video call (or stored from a previous video call) with the generic 3D face mesh in order to generate a hybrid 3D face mesh containing color, texture, and/or augmentation schema selections unique to the first user by spanning a generic 3D surface. Upon receipt of a next facial landmark container—for a next video frame—from the first device, the second instance of the application can pass these facial landmarks into the generic face reconstruction model to deform the hybrid 3D face mesh into alignment with the first user's face depicted in this next video frame, project a lighting model onto this deformed hybrid 3D face mesh, and then project this illuminated hybrid 3D face mesh onto the image plane in combination with a background to generate the next synthetic video frame for rendering on the second device.

1.13 Gaze Correction

In one variation, if gaze correction is activated by the first user for the current video call as described above, the second instance of the application at the second device can correct the first user's gaze to compensate for offset between camera and display at the first device by adjusting an eye position facial landmark relative to a nasal bridge facial landmark—extracted from a facial landmark container received from the first device—to realign the first user's eyes to the center (or top) of the display at the second device. More specifically, the second (or first) instance of the application can adjust eye landmarks—in a set of facial landmarks extracted from the current video frame at the first device—to align with a predicted or detected location of the second user (or the second user's eyes, more specifically) at the second device. In this implementation, the second instance of the application can then: generate a 3D synthetic face representation of the first user's face based on facial landmarks in this facial landmark container; locate the 2D color patch over the 3D synthetic face representation by snapping facial landmarks in the 2D color patch to facial landmarks in the 3D synthetic face representation, including the updated eye position facial landmark; project this colorized 3D synthetic face representation onto the image plane to generate a colorized 2D synthetic face representation of the first user; render this colorized 2D synthetic face representation with a background and realism overlay to generate a synthetic video frame depicting the first user; and then display this synthetic video frame for the second user.

1.14 Other Object

In one variation, the first instance of the application can implement similar models and methods to detect landmarks and generate landmark containers for other parts of the first user, such as the user's hands, arms, and/or torso; and the second instance of the application can implement similar models and methods to reconstruct representations of the first user's hands, arms, and/or torso based on these landmarks and to incorporate these representations into synthetic video frames rendered on the second device during the video call.

The first instance of the application can similarly detect landmarks and generate landmark containers for other objects in the field of view of the first device, such as a table, a wall, and a chair; and the second device can reconstruct these objects in synthetic video frames according to these landmarks during the video call.

1.15 Second Synthetic Video Feed

Simultaneously, the second device can generate and transmit facial landmark containers to the first device, and the first instance of the application can generate and render synthetic video frames—depicting the second user according to parameters elected by the second user—at the first device.

1.16 Variation: Latency Reduction

In one variation, if processing limitations (e.g., for facial landmark extraction, modeling, realism overlay generation) or rendering limitations (e.g., rendering the first user's face with the realism overlay over a synthetic background) at either the first or second device result in a delay—between capture of a video frame at the first device and rendering of a corresponding photorealistic synthetic frame at the second device—in excess of a threshold duration of time (e.g., 200 milliseconds), the first and second instances of the application can selectively suppress certain realism functionality in order to reduce computational load and thus reduce latency during this process. For example, the first and second instances of the application can cooperate to suppress extraction of texture information from video frames at the first device and incorporation of texture data in synthetic video frames at the second device, which may reduce time to generate this synthetic video feed and preserve resolution of the synthetic video feed—while also decreasing realism of the synthetic video feed—at the second device.

1.17 Variation: 2D Face Mesh

In one variation, rather than a 3D face mesh, the generic face reconstruction model defines a 2D mesh that ingests 2D coordinates of facial landmarks—output by the generic face deconstruction model based on a video feed of a user—to generate a deformed 2D face mesh of the user. In this variation, the second instance of the application can therefore: implement the generic face reconstruction model to generate a deformed 2D mesh based on a facial landmarks received from the first device; deform the realism overlay based on these facial landmarks; merge the deformed 2D mesh and the realism overlay with a lighting model and background image to generate a 2D synthetic video frame; and then render this 2D synthetic video frame on the second device.

1.18 Variation: Individual Model Generation

In one variation, rather than generate a 2D color patch of the first user for subsequent combination with a generic 3D face mesh at the second device, the first instance of the application (or the remote computer system) instead constructs a custom face deconstruction model and complementary custom face reconstruction model for the first user based on a short video clip of the first user. For example, the first instance of the application can record a short video clip of the first user during a setup period, as the first user initializes a video call, or during a first segment (e.g., the first 30 seconds) of a video call; and the first instance of the application or the remote computer system can automatically implement computer vision, deep learning, artificial intelligence, and/or other techniques to generate the custom face deconstruction and reconstruction models for the first user. For example, the custom face deconstruction model can include unique definitions for detecting facial landmarks in a video frame of the first user's face; and the custom face reconstruction model can include a colorized, texturized 3D face mesh—with corresponding landmark definitions—of the first user. The first instance of the application (or the remote computer system) can then implement the custom face deconstruction model locally and transmit the custom face reconstruction model to the second device. Upon receipt of the face reconstruction model for the first user, the second instance of the application can load facial landmarks—generated by the first instance of the application based on the custom face deconstruction model—into the custom face reconstruction model to directly generate a colorized, texturized 3D face mesh of the first user. The second instance of the application can then: illuminate the colorized, texturized 3D face mesh according to a lighting model selected by the first user; augment illuminated, colorized, texturized 3D face mesh according to augmentation schema selected by the first user; project this augmented, illuminated, colorized, texturized 3D face mesh onto an image plane; set the resulting synthetic 2D face image over a background selected by the first user; and render this resulting 2D synthetic video frame on a display at the second device.

2. Second Method

As shown in FIGS. 2A-2D, a second method S200 for video conferencing includes, at a first device associated with a first user: capturing a first video feed in Block S210; for a first frame, in the first video feed, captured at a first time, detecting a first constellation of facial landmarks in the first frame in Block S220 and representing the first constellation of facial landmarks in a first facial landmark container in Block S222; and transmitting the first facial landmark container and a first audio packet, captured at approximately (e.g., within 50 milliseconds of) the first time, to a second device in Block S230. The second method S200 also includes, at the second device associated with a second user: accessing a first face model representing facial characteristics of the first user in Block S240; accessing a synthetic face generator in Block S242; transforming the first facial landmark container and the first face model into a first synthetic face image according to the synthetic face generator in Block S250; rendering the first synthetic face image at a second time in Block S260; and outputting the first audio packet at approximately (e.g., within 50 milliseconds of) the second time in Block S262.

As shown in FIGS. 2A-2D, one variation of the second method S200 includes, at a first device associated with a first user: capturing a first video feed in Block S210; representing constellations of facial landmarks, detected in the first video feed, in a first feed of facial landmark containers in Block S222; and transmitting the first feed of facial landmark containers to a second device in Block S230. This variation of the second method S200 also includes, at the second device associated with a second user: accessing a first face model representing facial characteristics of the first user in Block S240; accessing a synthetic face generator in Block S242; transforming the first feed of facial landmark containers and the first face model into a first feed of synthetic face images according to the synthetic face generator in Block S250; and rendering the first feed of synthetic face images in Block S252.

As shown in FIGS. 2A-2D, another variation of the second method S200 includes, at a first device associated with a first user: capturing a first video feed in Block S210; for a first frame, in the first video feed, captured at a first time, detecting a first constellation of facial landmarks in the first frame in Block S220 and representing the first constellation of facial landmarks in a first facial landmark container in Block S222; and transmitting the first facial landmark container and a first audio packet, captured at approximately the first time, to a second device in Block S230. This variation of the second method S200 also includes, at the second device associated with a second user: accessing a first face model representing facial characteristics of the first user in Block S240; accessing a synthetic face generator in Block S242; transforming the first facial landmark container and the first face model into a first synthetic face image according to the synthetic face generator in Block S250; rendering the first synthetic face image at a second time in Block S260; outputting the first audio packet at approximately (e.g., within 50 milliseconds of) the second time in Block S262; capturing a second video feed in Block S210; for a second frame, in the second video feed, captured at approximately (e.g., within one second of) the first time, detecting a second constellation of facial landmarks in the second frame in Block S220 and representing the second constellation of facial landmarks in a second facial landmark container in Block S222; and transmitting the second facial landmark container to the first device in Block S230. This variation of the second method S200 further includes, at the first device: accessing a second face model representing facial characteristics of the second user in Block S240; accessing the synthetic face generator in Block S242; transforming the second facial landmark container and the second face model into a second synthetic face image according to the synthetic face generator in Block S250; and rendering the second synthetic face image at approximately (e.g., within one second of) the second time in Block S252.

2.1 Applications

Like the first method S100 described above, Blocks of the second method S200 can be executed by native or browser-based applications executing on a set of computing devices (e.g., smartphones, tablets, laptop computers) during a video call between two users in order: to compress a first video feed of a first user into a first lightweight (e.g., sub-kilobyte) feed of constellations of facial landmarks at a first device; and to reconstruct this first video feed at a second device by injecting this feed of facial landmark constellations and a first (pseudo-) unique face model of the first user into a synthetic face generator, which outputs a first stream of synthetic, photorealistic images of the first user that the second device then renders in near real-time. Simultaneously, the second device can compress a second video feed of the second user into a second lightweight constellation of facial landmarks; and the first device can reconstruct this second video feed by injecting this feed of facial landmark constellations and a second (pseudo-) unique face model of the second user into a synthetic face generator, which outputs a second stream of synthetic, photorealistic images of the second user that the first device then renders in near real-time.

2.1.1 Bandwidth

In particular, rather than transmit and receive data-rich video feeds during a video call, a first device executing Blocks of the second method S200 can instead extract facial landmark constellations from a first video feed captured at the first device, package these facial landmark constellations into facial landmark containers, and transmit a first feed of facial landmark containers to the second device. The second device can then: leverage a local copy of the synthetic face generator and a local copy of a first face model associated with the first user to transform the first feed of facial landmark containers into a photorealistic representation of the first user's face; and render this first photorealistic synthetic video feed in near real-time. Concurrently, the second device—also executing Blocks of the second method S200—can extract facial landmark containers from a second video feed captured at the second device and transmit a second feed of facial landmark containers to the second device. The first device can then: leverage a local copy of the synthetic face generator and a local copy of a second face model associated with the second user to transform the second feed of facial landmark containers into a photorealistic representation of the second user's face; and render this second photorealistic synthetic video feed in near real-time. The second user may thus experience the video call as though a color video was received from the first user's device—and vice versa—without necessitating a consistent, high-bandwidth, low-latency data connection between the first and second devices.

More specifically, by extracting facial landmark containers from a high(er)-definition video feed according to the second method S200, the first device can compress this high(er)-definition video feed by multiple orders of magnitude (e.g., by approximately 100 times). Transmission of a feed of facial landmark containers—at a natural frame rate of the original high(er)-definition video (e.g., 24 frames per second)—from the first device to the second device during a video call may therefore require significantly less bandwidth than the original high-definition video (e.g., less than 10 kilobits per second rather than 1.5 Megabits per second). The second device can: then reconstruct the first video feed of the first user by passing a local copy of a (pseudo)-unique face model of the first user and a first feed of facial landmark containers—received from the first device—into a synthetic face generator, which rapidly outputs a stream of synthetic, photorealistic images of the first user's face (e.g., in under 100 milliseconds or within as little as 30 milliseconds of a receipt of each subsequent facial landmark container from the first device); and render this stream of synthetic, photorealistic images of the first user's face. Therefore, the first and second devices can execute Blocks of the second method S200 to support consistent, high-quality video—with significantly less upload and download bandwidth—during a video call.

2.1.2 Latency

Furthermore, humans may perceive audible and visual events temporally offset by up to 200 milliseconds as occurring concurrently. However, the first and second devices can cooperate to rapidly execute Blocks of the second method S200. For example, the first device can: capture a video frame; generate first facial landmark container representing a first facial landmark constellation detected in this video frame; and upload this first facial landmark container to a computer network within 50 milliseconds. The second device can then: download this facial landmark container; inject this facial landmark container and a stored local copy of a first face model of the first user into a local copy of the synthetic face generator to generate a synthetic face image; overlay the synthetic face image on a static or animated background frame to generate a synthetic video frame; and render the synthetic video frame on a display of the second device within 150 milliseconds of receipt of the facial landmark container.

Generally, because the first device compresses a video feed (e.g., by orders of magnitude) into a stream of facial landmark containers (e.g., in the form of a vector containing 68 (x,y) coordinates for 68 predefined facial landmarks), packet size for facial landmark containers transmitted from the first device to the second device may be relatively very small. Therefore, throughput requirements to transmit this stream of facial landmark containers between the first and second devices over wireless and local area networks may be significantly less than actual throughputs supported by these networks. More specifically, transmission of this lightweight stream of facial landmark containers from the first device to the second device may represent a relatively small portion of the total duration of time from capture of a video frame at the first device to reconstruction and rendering of a corresponding synthetic video frame at the second device. Accordingly, this stream of facial landmark containers may not (or may very rarely) approach throughput limitations of these networks, thereby enabling these networks to transmit this lightweight stream of facial landmark containers from the first device to the second device with low latency, low packet loss, and high consistency despite changes in traffic between other devices connected to these networks and even during periods of high traffic on these networks.

2.1.3 Realism

By executing Blocks of the second method S200, the first and second devices can render authentic, photorealistic representations of the second and first users, respectively, during a video call—such as relative to cartoons, avatars, or caricatures that may loose authenticity and integrity due to compression and simplification of user facial expressions.

For example, the first device and/or a remote computer system (e.g., a remote server, a computer network) can: access an image (e.g., a digital photographic image, a frame from a video clip) of the first user; detect the first user's face in this image; implement a standard or generic facial landmark extractor to detect and extract a facial landmark constellation; from this image; represent this facial landmark constellation in a facial landmark container; initialize a first face model containing an initial set of coefficients (or "weights"); pass this facial landmark container and the initial face model into a synthetic face generator to generate an initial synthetic face image; characterize a difference between this initial synthetic face image and the first user's face depicted in the image; and iteratively adjust coefficients in the first face model such that insertion of this first face model and the facial landmark container into the synthetic face generator produces synthetic face images with smaller differences from the first user's face depicted in the image. Once a difference between a synthetic face image thus produced according to the first face model and the first user's face depicted in the image falls below a threshold difference, the first device or the remote computer system can store this first face model in association with the first user, such as in an account or profile associated with the user.

In this example, the first device and/or the remote computer system can implement this process when the first user creates an account within a first instance of the native or browser-based video conferencing application executing on the first device, during a setup period just before starting a video call with the second device, or after starting a video call with the second device. Additionally or alternatively, the first device (or the remote computer system) can repeat this process for additional images or video clips of the first user (e.g., depicting the first user with various facial expressions and from various perspectives) and fuse face models thus calculated for these additional images or video clips into a single, more robust face model of the user.

The first device (or the remote computer system) can then share this face model—specific to the first user—with a second device before or during a video call. During this video call, the first device can also capture a video frame via an integrated or connected camera, extract a facial landmark container from this video frame, and stream this facial landmark container to the second device. The second device can then implement this face model to transform this facial landmark container into a synthetic, photorealistic image of the first user's face, which exhibits a facial expression of the first user, a mouth shape of the first user, and a position of the first user relative to the camera at a time that the camera captured the video frame.

Therefore, though the first device streams a feed of facial landmark containers to the second device rather than a live video feed of photographic video frames, the second device can leverage the face model of the first user and the synthetic face image to generate a photorealistic feed of synthetic images that both: appear to the second user as the first user; and authentically reproduce the first user's facial expression, mouth shape, and a position relative to the first device.

2.1.4 Devices

The second method S200 is described herein as executed by instances of a video conferencing application (hereinafter the "application"), such as a native video conferencing application or a browser application operable within a web browser executing on a device, such as a smartphone, tablet, or laptop computer.

Furthermore, Blocks of the second method S200 are described herein as executed: by a first device to transform a first live video feed of a first user into facial landmark containers and to stream facial landmark containers to a second device; and by a second device to reconstruct and render a photorealistic, synthetic representation of the first video feed for viewing by a second user. However, the second device can simultaneously transform a second live video feed of the second user into facial landmark containers and stream facial landmark containers to the first device; and the first device can simultaneously reconstruct and render a photorealistic, synthetic representation of the second video feed for viewing by the first user.

Furthermore, the second method S200 is described herein as implemented by consumer devices to host a two-way video call between two users. However, the first method S100 can be similarly implemented by a device to host one-way live video distribution, or asynchronous video replay. Additionally or alternatively, Furthermore, the second method S200 can be executed by multiple devices to host a multi-way video call between multiple (e.g., three, ten) users.

2.2 Facial Landmark Extractor

Figure 4:
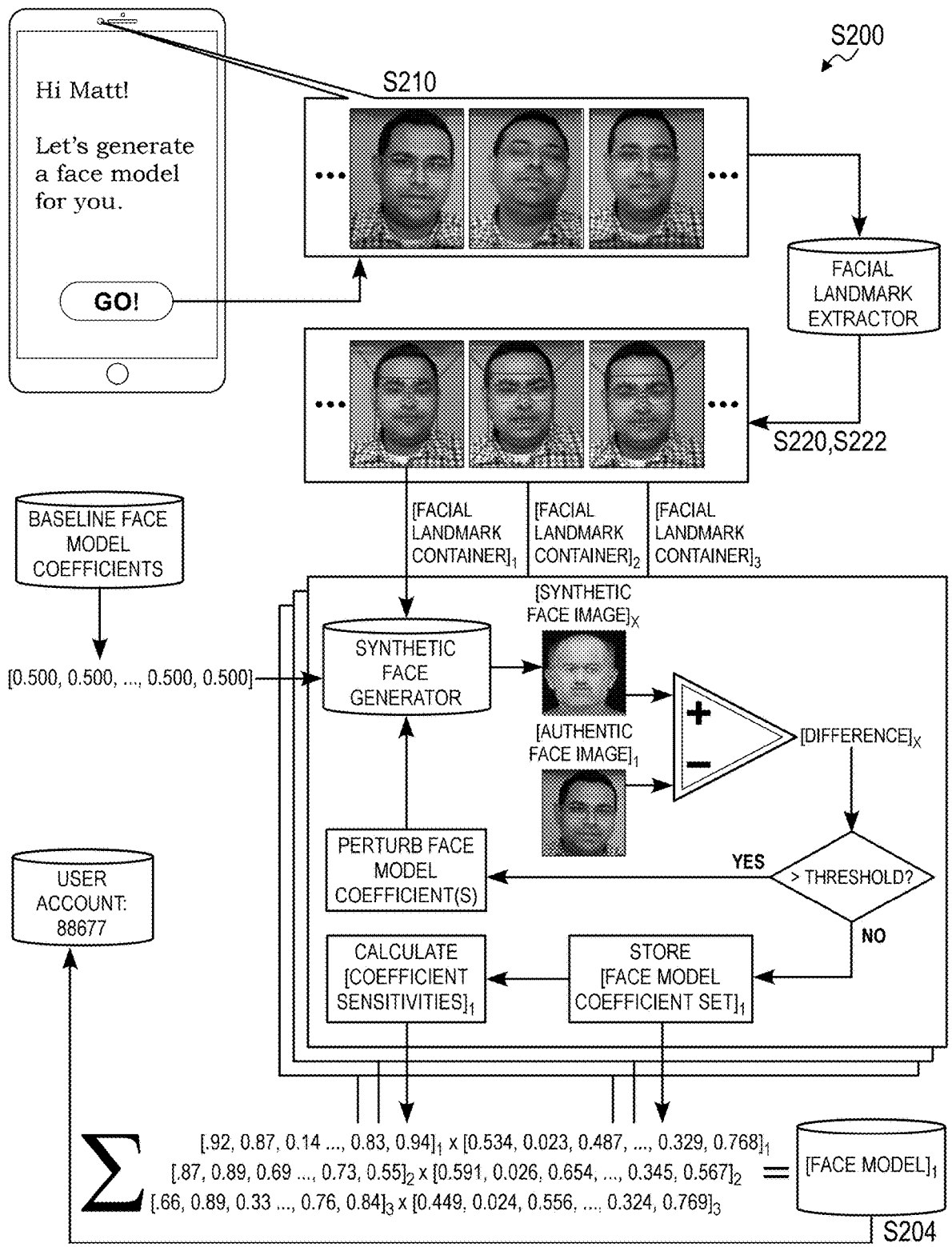
FIG. 4 is a flowchart representation of one variation of the second method.
Figure 5:
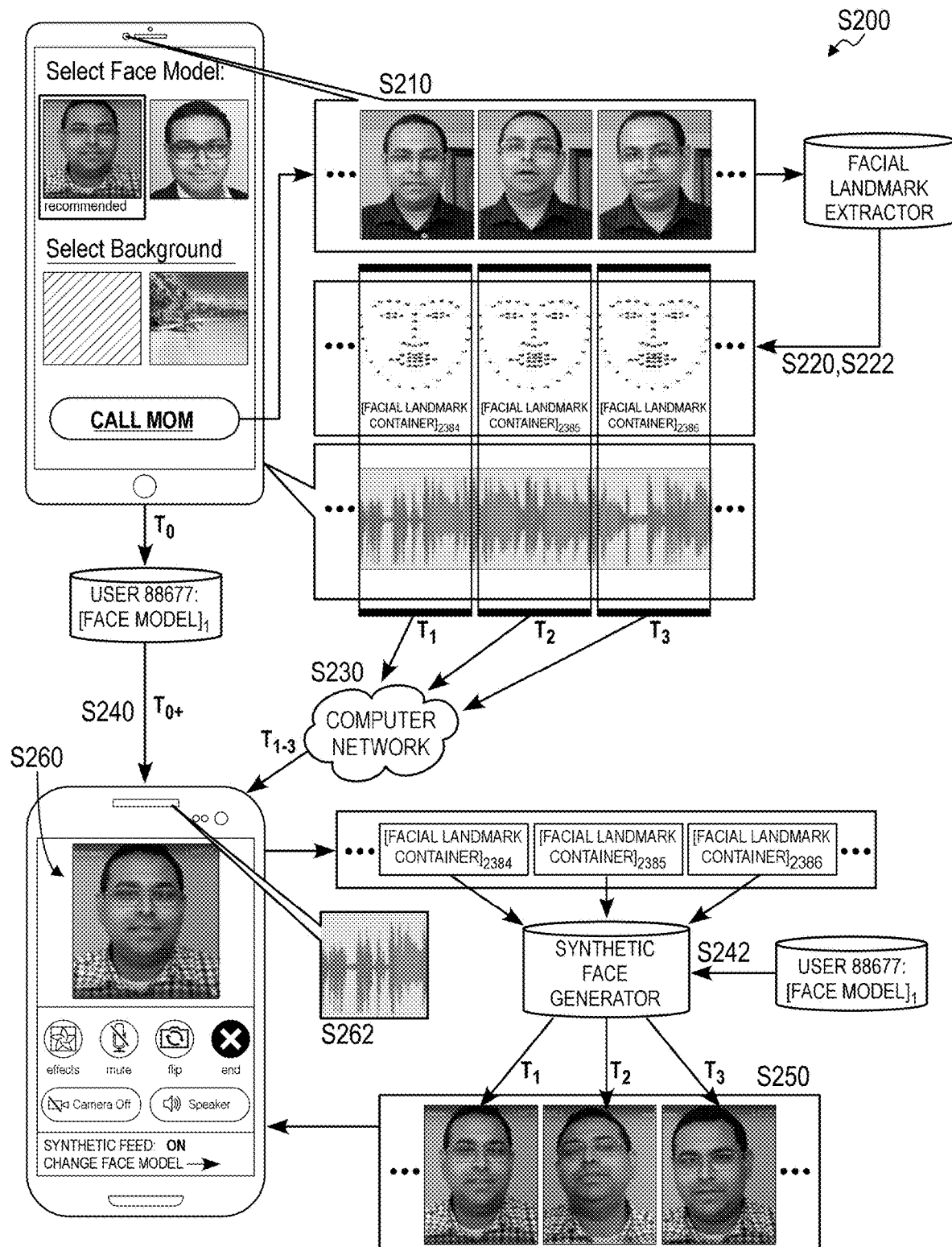
FIG. 5 is a flowchart representation of one variation of the second method.

Generally, a device executing the application and/or the remote computer system can implement a facial landmark extractor: to detect a face in a region of an image (e.g., a photographic image, a frame in a video clip, and/or a frame in a live video feed); to scan this region of the image for features analogous to predefined facial landmark types; and to represent locations, orientations, and/or sizes, etc. of these analogous features—detected in the region of the image—in one facial landmark container. In particular, like the facial deconstruction model described above, the device and/or the remote computer system can implement the facial landmark extractor: to detect spatial characteristics of a face—such as including positions of eye corners, a nose tip, nostril corners, mouth corners, end points of eyebrow arcs, ear lobes, and/or a chin—depicted in a 2D image; and to represent these spatial characteristics in a single container (e.g., a vector, a matrix), as shown in FIGS. 4 and 5. For example, the device and/or the remote computer system can implement facial landmark detection to extract a facial landmark container: from a video frame during generation of a face model for a user (e.g., during initial setup of the user's account); from a photographic image during generation of a "look model" for the user; and/or from a video frame for transmission to a second device during a video call.

In one implementation shown in FIGS. 4 and 5, to generate a facial landmark container from an image (or frame), the device (or the remote computer system): accesses the image; implements facial detection techniques to detect a face in a region of the image; and initializes a facial landmark container in the form of a vector of length equal to a total quantity of predefined facial landmark types (e.g., 68). Then, for a first facial landmark type in this predefined set of facial landmark types, the device: scans the region of the frame for a feature analogous to the first facial landmark type; extracts a first location (and/or a first size, first orientation) of a particular feature depicted in the image in response to identifying this particular feature as analogous to (e.g., of a similar form, relative location, relative size) the first facial landmark type according to the facial landmark extractor; and then writes this first location (and/or first size, first orientation) of the particular feature to a first position in the vector corresponding to the first facial landmark type. Similarly, for a second facial landmark type in this predefined set of facial landmark types, the device: scans the region of the frame for a feature analogous to the second facial landmark type; and then writes a null value to a second position in the vector corresponding to the second facial landmark type in response to failing to identify a particular feature analogous to the second facial landmark time in the region of the image. The device then repeats this process for each other facial landmark type in the predefined set in order to complete the facial landmark container for this image.

Furthermore, in this example, the device (or the remote computer system) can generate a facial landmark container that represents a pixel position (e.g., an (x,y) coordinate) of each detected facial landmark type within the image—and not specifically the position of the facial landmark within the region of the image depicting the user's face—such that insertion of this facial landmark container and a face model of the user into a synthetic face generator: produces a synthetic face image that appears as a photographic analog of the user's face depicted in the image; and locates this synthetic face image in a position within a synthetic video frame that is analogous to the location of the user's face depicted in the image 2.3 Synthetic Face Generator Similarly, the device and/or the remote computer system can implement a synthetic face generator to transform a facial landmark container—representing a facial expression of a user detected in an image or frame—and a face model of the user into a synthetic face image, which defines a photorealistic representation of the user's face with this same facial expression. In particular, like the facial reconstruction model described above, the device and/or the remote computer system can inject a facial landmark container—derived from an original image or frame of a user—and a face model of the user into the synthetic face generator to generate a synthetic face image that may be perceived as (at least) a superficially authentic photorealistic representation of the user's face with the same facial expression depicted in the original image or frame. For example, the device and/or the remote computer system can implement the synthetic face generator to generate a synthetic face image: to generate and validate a new face model for a user (e.g., during initial setup of the user's account); to generate and validate a new look model for the user; and/or to generate synthetic face images of another user during a video call.

Figure 3:
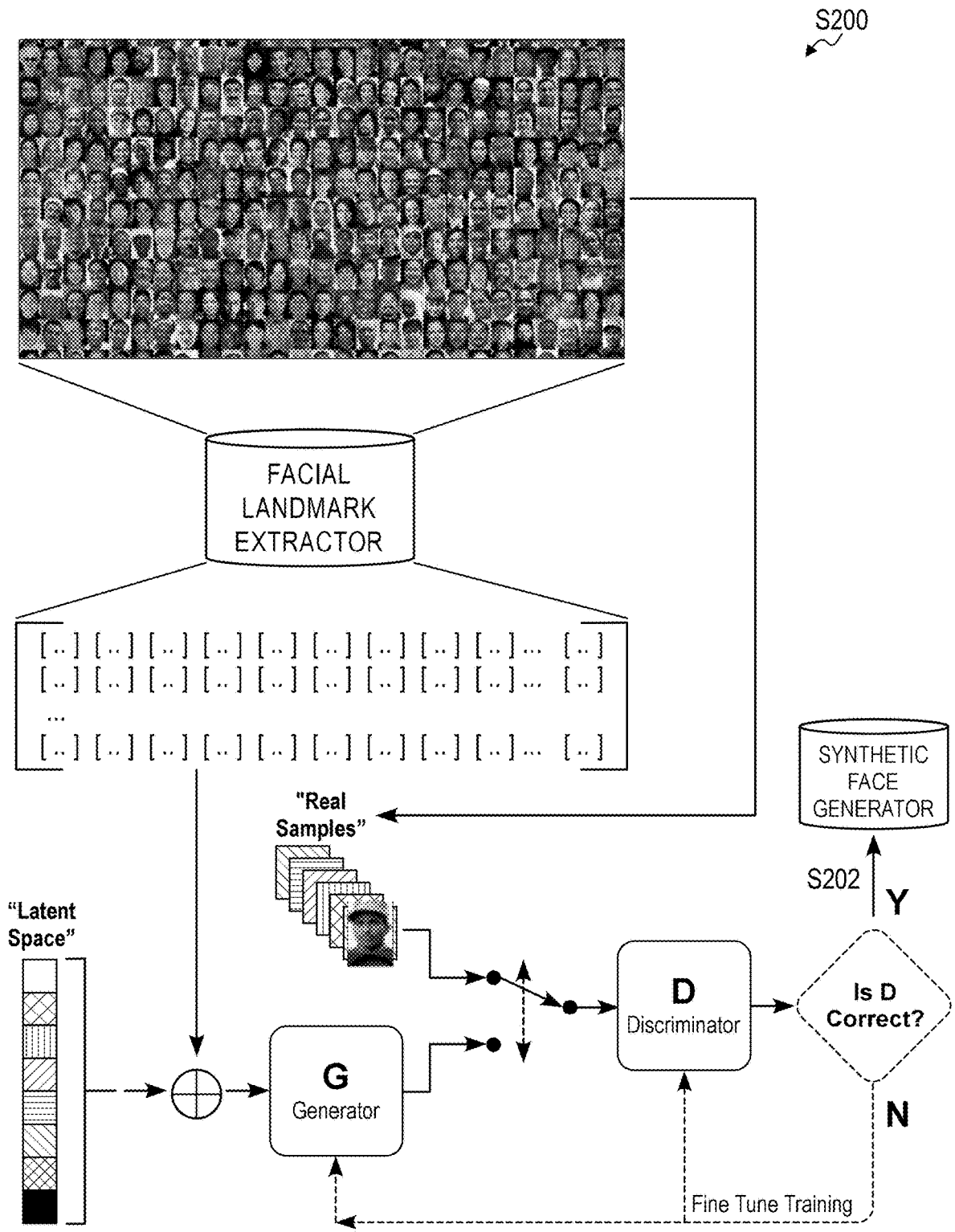
FIG. 3 is a flowchart representation of one variation of the second method.

In one implementation shown in FIG. 3, the remote computer system: accesses a population of images of human faces (e.g., thousands, millions or 2D color images of human faces); implements the facial landmark extractor to extract a facial landmark container for each image in the population; and trains a conditional generative adversarial network to generate an image—given a facial landmark container and a face model containing a set of coefficients or "weights"—with statistics analogous to the population of images in Block S202.

In particular, in Block S202, the remote computer system can train the conditional generative adversarial network to output a synthetic face image based on a set of input conditions, including: a facial landmark container, which captures relative locations (and/or sizes, orientations) of facial landmarks that represent a facial expression; and a face model, which contains a (pseudo-) unique set of coefficients characterizing a unique human face and secondary physiognomic features (e.g., face shape, skin tone, facial hair, makeup, freckles, wrinkles, eye color, hair color, hair style, and/or jewelry). Therefore, the remote computer system can input values from a facial landmark container and coefficients from a face model into the conditional generative adversarial network to generate a synthetic face image that depicts a face—(uniquely) represented by coefficients in the face model—exhibiting a facial expression represented by the facial landmark container.

The remote computer system can then store this conditional generative adversarial network as a synthetic face generator in Block S202 and distribute copies of this synthetic face generator to devices executing the application, as shown in FIG. 3.

2.4 Face Model Generation

Furthermore, the device can leverage the facial landmark extractor and the synthetic face generator to generate a face model for a user associated with the device in Block S204, such as: based on a video clip captured by the device during a user account setup period; based on a video clip captured by the device just before (e.g., seconds, minutes before) initiating a video call with another device; or based on an image uploaded or selected by the user before or during a video call with another device.

2.4.1 Single-Image Face Model Calculation

In one implementation, the device (or the remote computer system): accesses a target image of the user; detects a face in a target region of the target image; and implements the facial landmark extractor to generate a target facial landmark container. The device then: defines a target set of face model coefficients (or "weights," "conditions"); implements the synthetic face generator to transform the target facial landmark container and the target set of face model coefficients into a target synthetic face image; and characterizes a first difference between the target synthetic face image and the target region of the target image depicting the face. The device further: adjusts the target set of face model coefficients to reduce the first difference; implements the synthetic face generator to transform the target facial landmark container and the revised set of face model coefficients into a revised synthetic face image; characterizes a revised difference between the target synthetic face image and the revised region of the target image depicting the face; and repeats this process until this difference becomes asymptotic, approaches a null value, or falls below a threshold difference. Finally, the device generates a face model of the user based on the final set of face model coefficients thus calculated for the target image.

In this implementation, the user may upload or link to an existing image of herself, such as a digital copy of a headshot photograph or a profile image from a social networking website. Alternatively, the device can capture a photographic image of the user, such as during a user account setup period or just before (e.g., seconds, minutes before) a video call is started at the device. The device can then process this image locally to generate a face model for the user or upload this image to the remote computer system for remote face model generation.

In particular, the device (or the remote computer system) can: detect a face in a region of the image; extract or store this region of the image depicting the user's face as an "authentic face image"; implement the facial landmark extractor to extract a set of facial landmarks from the region of the image; and store these facial landmarks in a facial landmark container. The device can then initialize a new face model for the user containing a set of baseline coefficients. For example, the device can: initialize set of baseline coefficients that represent an "average" face (e.g., [0.500, 0.500, 0.500, . . . , 0.500, 0.500]); or pseudorandomly calculate baseline values for each coefficient in the new face model (e.g., [0.534, 0.023, 0.487, . . . , 0.324, 0.768]). The device injects baseline coefficients within the face model and the facial landmark container into the synthetic face generator, which outputs a "baseline" synthetic face image and characterizes a baseline difference between the authentic face image and the baseline synthetic face image.

In one example, the device: compresses or upsamples the synthetic face image to match a resolution of the authentic face image; subtracts the baseline synthetic face image from the authentic face image in the green color space to calculate a deviation image in the green color space; calculates a green-space deviation value based on a combination (e.g., a sum) of absolute values contained in pixels in the green-space deviation image; repeats this process for the blue and red color spaces to calculate red- and blue-space deviation values; and quantifies a total difference between the authentic face image and the baseline synthetic face image based on a combination (e.g., a sum, an average) of the red-, green-, and blue-space deviation values.

In another example, the device implements a structural similarity index (or "SSIM") to quantify a baseline difference between the baseline synthetic face image and the authentic face image. In yet another example, the device: implements a facial recognition system to calculate a confidence that the face depicted in the synthetic face image is identical to the face depicted in the authentic face image; and characterizes a baseline difference between the synthetic face image and the authentic face image based on (e.g., inversely proportional to) this confidence.

Then, if the baseline difference exceeds a threshold (e.g., if a combination of red-, green-, and blue-space deviation values exceeds a threshold value; if a structural similarity index value for the baseline synthetic face image exceeds a threshold), then the device (or the remote computer system) can repeat the foregoing process to refine and validate coefficients in the face model.

For example, the device can implement reverse propagation techniques to adjust (or "perturb") a first coefficient in the face model in a first direction and repeat the foregoing process to generate a revised synthetic face image based on this revised face model and the facial landmark container. Then, if a revised difference between the authentic face image and this revised synthetic face image is less than the baseline difference, the device can further perturb the first coefficient in the face model in the first direction. Conversely, if this revised difference between the authentic face image and the regenerated synthetic face image is greater than the baseline difference, the device can perturb the first coefficient in the face model in the opposite direction.

The device can repeat the foregoing process to refine the first coefficient in the face model, generate a new synthetic face image according to this revised face model, and verify that this new synthetic face image represents a better approximation of (i.e., exhibits less deviation from) the authentic face image than a synthetic face image generated according to a previous revision of the face model. The device can thus converge on a value for the first coefficient that minimizes a difference between: the authentic face image; and a synthetic face image generated by the synthetic face generator given the facial landmark container.

The device can repeat this process for each other coefficient in the face model in order to converge on a set of coefficients that minimize a difference between: the authentic face image; and a synthetic face image generated by the synthetic face generator given the facial landmark container. The device can also: store this set of coefficients in an initial face model; and then again repeat the foregoing process to further refine (or "tune") these coefficients, starting with this set of coefficients in the initial face model rather than baseline (e.g., average or pseudorandomly-generated) coefficients described above.

(In one variation, the device can implement the foregoing methods and techniques to tune multiple coefficients in the face model concurrently rather than tune coefficients in the face model individually.)

Once a difference between the authentic face image and a synthetic face image generated according to this set of coefficients becomes asymptotic, approaches a null value, or falls below a threshold difference, etc., the device (or the remote computer system) can store this set of coefficients in a face model and associate this face model with the user.

The device can therefore iteratively refine a set of coefficients in order to generate a face model that—when injected into the synthetic face generator with the facial landmark container—produces a synthetic face image that approximates the authentic face image, such as to a degree that a human may recognize the user in the synthetic face image and/or such that a human may discern no or limited visual differences between the authentic face image and the synthetic face image. More specifically, the device can execute the foregoing process to tune coefficients within a face model for the user such that insertion of this face model and the facial landmark container—extracted from the authentic face image—into the synthetic face generator produces a realistic approximation of the facial expression, face shape, skin tone, facial hair, makeup, freckles, wrinkles, eye color, hair color, hair style, and/or jewelry, etc. depicted in the authentic face image. Furthermore, insertion of this face model and a different facial landmark container—such as extracted from a video frame captured by the device during a later video call—into the synthetic face generator produces a realistic approximation of: the face shape, skin tone, facial hair, makeup, freckles, wrinkles, eye color, hair color, hair style, and/or jewelry, etc. depicted in the authentic face image; and the facial expression depicted in the video frame.

2.4.2 Face Model Calculation with Multiple Images

In a similar implementation shown in FIG. 4, the device (or the remote computer system) accesses a video clip of the user (e.g., captured by the device during a user account setup period, during a video call setup period preceding a video call with another user). For each frame in a (sub)set of frames in the video clip, the device implements methods and techniques described above to: detect the user's face in a region of the frame; characterize positions of a set of features—analogous to facial landmark types in the predefined set of facial landmark types—in the region of the frame; represent positions of the set of features in a facial landmark container; initialize a set of face model coefficients; insert the facial landmark container and the set of face model coefficients into the synthetic face generator to generate a synthetic face image; characterize a difference between the synthetic face image and the region of the frame depicting the face; and iteratively adjust the set of face model coefficients to reduce a difference between the region of the frame and a synthetic face image generated according to these face model coefficients. The device then calculates a combination of these sets of face model coefficients associated with this (sub)set of frames and stores this combination as a face model for the user in Block S204.

In this implementation, the user may upload an existing video clip of herself, such as a video clip between five seconds and one minute in duration and/or containing between ten and 1,000 frames. Alternatively, the device can capture a video clip of the user, such as when a video call function is selected by the user and before a video call is initiated at the device. The device can then process this video clip locally to generate a face model for the user or upload this video clip to the remote computer system for remote face model generation.

2.4.2.1 Frame Selection

In particular, the device (or the remote computer system) can extract a set of frames from the video clip and then execute the foregoing methods and techniques to converge on a set of coefficients for each frame in this set. For example, the device can: implement methods and techniques described above to detect the user's face in each frame in the video clip; implement the facial landmark extractor to generate a facial landmark container for each frame in the video clip; and select a subset of frames (e.g., ten frames, 32 frames, 64 frames)—from the video clip—that correspond to facial landmark containers exhibiting least similarity and/or greatest ranges of facial landmark values within this set of facial landmark containers. More specifically, the device can compare facial landmark containers extracted from frames in the video clip to identify a subset of frames that represent a greatest range of face poses and facial expressions within the video clip.

2.4.2.2 First Frame

The device can then: select a first frame—from this subset of frames—associated with a first facial landmark container; extract a first authentic face image from a region of the first frame depicting the user's face; initialize a set of baseline coefficients, as described above; and execute the processes described above to perturb these baseline coefficients and to converge on a first set of coefficients that—when combined with the first facial landmark container—produces a synthetic face image exhibiting a minimum difference from the first authentic face image.

2.4.2.3 Sensitivity

The device can also characterize a sensitivity of each coefficient—in this first set of coefficients—to accurate reproduction of the first authentic face image.

For example, once the device converges on a final value of a first coefficient in this first set of coefficients, the device can: pass the first set of coefficients—including the final value of the first coefficient—and the first facial landmark container into the synthetic face generator to generate a first synthetic face image; quantify a first difference between the first synthetic face image and the first authentic face image; perturb the final value of the first coefficient—in the first set of coefficients—by a perturbation unit (e.g., "0.005"); pass this perturbed set of coefficients—including the perturbed value of the first coefficient—and the first facial landmark container into the synthetic face generator to generate a perturbed synthetic face image; quantify a perturbed difference between the perturbed synthetic face image and the first authentic face image; and calculate a sensitivity of the first coefficient for the first frame proportional to a magnitude of difference between the first difference and the perturbed difference.

More specially, if perturbation of the final value of the first coefficient by the perturbation unit produces a small deviation from maximum (or "best") correspondence between a synthetic face image and the first authentic face image, the device can calculate a low sensitivity of the first coefficient for the first frame. However, if perturbation of the final value of the first coefficient by the perturbation unit produces a large deviation from maximum (or "best") correspondence between a synthetic face image and the first authentic face image, the device can calculate a high sensitivity of the first coefficient for the first frame.

The device can repeat this process for each other coefficient in the first set of coefficients to characterize sensitivity of accurate reproduction of the first authentic face image to each coefficient in this first set of coefficients.

2.4.2.4 Additional Frames

The device can repeat the foregoing process for each other frame in the (sub)set of frames, including: calculating a set of coefficients that minimize a difference between an authentic face image extracted from a frame and a synthetic face image generated according to the set of coefficients and a facial landmark container extracted from the frame image; and characterizing sensitivity of accurate reproduction of the authentic face image to each coefficient in the set of coefficients for each frame in the (sub)set of frames.

More specifically, the device can repeat the foregoing process for each other frame in the (sub)set of frames in order to generate a population of coefficient sets, wherein each set of coefficients in the population is tuned for one corresponding frame in the (sub)set of frames and wherein each coefficient in each set of coefficients in the population is associated with a sensitivity.

2.4.2.5 Face Model Composition

The device can then combine corresponding coefficients across this population of coefficient sets to calculate a face model for the user.

For example, the device can: calculate a first linear combination of first coefficients—across this population of coefficient sets—weighted by their corresponding sensitivities; store this first linear combination as a first composite coefficient; calculate a second linear combination of second coefficients—across this population of coefficient sets—weighted by their corresponding sensitivities; store this second linear combination as a second composite coefficient; and repeat this process for each other coefficient in this population of coefficient sets. The device then aggregates these composite coefficients into a face model for the user Therefore, the device can execute the foregoing process to tune coefficients within sets of coefficients for individual frames depicting the user and then fuse these sets of coefficients into one face model for the user. Insertion of this face model and a first facial landmark container—extracted from a first frame in this set—into the synthetic face generator produces a first realistic approximation of the facial expression, face shape, skin tone, facial hair, makeup, freckles, wrinkles, eye color, hair color, hair style, and/or jewelry, etc. depicted in the first frame. Similarly, insertion of this face model and a second facial landmark container—extracted from a second frame in this set—into the synthetic face generator produces a second realistic approximation of the facial expression, face shape, skin tone, facial hair, makeup, freckles, wrinkles, eye color, hair color, hair style, and/or jewelry, etc. depicted in the second frame.

Furthermore, insertion of this face model and a different facial landmark container—such as extracted from a video frame captured by the device during a later video call—into the synthetic face generator produces a realistic approximation of: the face shape, skin tone, facial hair, makeup, freckles, wrinkles, eye color, hair color, hair style, and/or jewelry, etc. depicted in the set of frames; and the facial expression depicted in the video frame.

2.4.3 Look Model

In one variation, the device (or the remote computer system) executes the foregoing processes: to calculate a set of face model coefficients for a "look" image uploaded or selected by the user (e.g., a digital photograph representing a physiognomy preferred by the user); to calculate a population of face model coefficient sets for frames in a video clip of the user; and to fuse these face model coefficient sets into a "look" model for the user, which yields synthetic face images that appear as the face in the "look" image when inserted into the synthetic face generator but that exhibit greater robustness to changes in face orientation and facial expression than a face model generated from a single frame or image.

For example, the device can execute the process described above to: extract a target authentic face image from the look image; extract a target facial landmark container from the target authentic face image; converge on a target set of coefficients that minimize a difference between the target authentic face image and a synthetic face image generated by the synthetic face generator given the facial landmark container; and characterize sensitivity of accurate reproduction of the target authentic face image to each coefficient in the target set of coefficients.

The device can then combine this target set of coefficients with the face model—generated according to a (sub)set of frames extracted from a video clip—to generate a look model for the user. For example, the device can: retrieve a population of coefficient sets generated for the user based on the (sub)set of frames; retrieve a sensitivity for each coefficient in each coefficient set in this population; assign a target weight (e.g., 0.900) to each coefficient in the target set of coefficients generated according to the look image; and assign a secondary weight—less than the target weight (e.g., 0.100)—to each coefficient set in the population of coefficient sets. For a first coefficient, the device can then: calculate a corrected weight of the first coefficient in the target set of coefficients based on a combination (e.g., a product) of the target weight and a sensitivity of the first coefficient in the target set of coefficients; calculate corrected weights of the first coefficient across the population of coefficient sets based on combinations (e.g., products) of the secondary weight and sensitivities of the first coefficient across the population of coefficient sets; calculate a first linear combination of first coefficients—across the target coefficient set and the population of coefficient sets—according to their corresponding corrected weights; and store this first linear combination as a first composite coefficient in the look model. Similarly, for a second coefficient, the device can: calculate a corrected weight of the second coefficient in the target set of coefficients based on a combination of the target weight and a sensitivity of the second coefficient in the target set of coefficients; calculate corrected weights of the second coefficient across the population of coefficient sets based on combinations of the secondary weight and sensitivities of the second coefficient across the population of coefficient sets; calculate a second linear combination of second coefficients—across the target coefficient set and the population of coefficient sets—according to their corresponding corrected weights; and store this second linear combination as a second composite coefficient in the look model. The device can repeat this process for each other coefficient in this target set of coefficients and the population of coefficient sets in order to complete this look model for the user.

Therefore, the device can execute the foregoing process to tune coefficients in the face model according to a look image provided by the user and to compile these tuned coefficients into a look model. Insertion of this look model and a first facial landmark container—extracted from a look image—into the synthetic face generator produces a realistic approximation of the facial expression, face shape, skin tone, facial hair, makeup, freckles, wrinkles, eye color, hair color, hair style, and/or jewelry, etc. depicted in the look image.

Furthermore, insertion of this look model and a different facial landmark container—such as extracted from a video frame captured by the device during a later video call—into the synthetic face generator produces a realistic approximation of: the face shape, skin tone, facial hair, makeup, freckles, wrinkles, eye color, hair color, hair style, and/or jewelry, etc. depicted in the look image; and the facial expression depicted in the video frame.

More specifically, in this variation, the device can leverage the face model (or a population of coefficient sets) generated for the user in order to create a "look model" based on a single look image. When the look model is injected into the synthetic face generator, the synthetic face generator can thus return a synthetic face image that approximates: the skin tone, facial hair, makeup, hair style, and/or jewelry, etc. depicted in the look image; rather than the skin tone, facial hair, makeup, hair style, and/or jewelry, etc. depicted in the set of images that yielded the face model. In particular, synthetic face images generated by the synthetic face generator according to the look model may thus resemble the user's face in the look image rather than the user's face in the set of frames.

The device can thus generate a new look model for the user based on a single look image provided by the user, such as a personal favorite candid photo of the user from an event for which a video or multiple images of the user are not available.

2.4.4 Multiple Looks

Figure 2A:
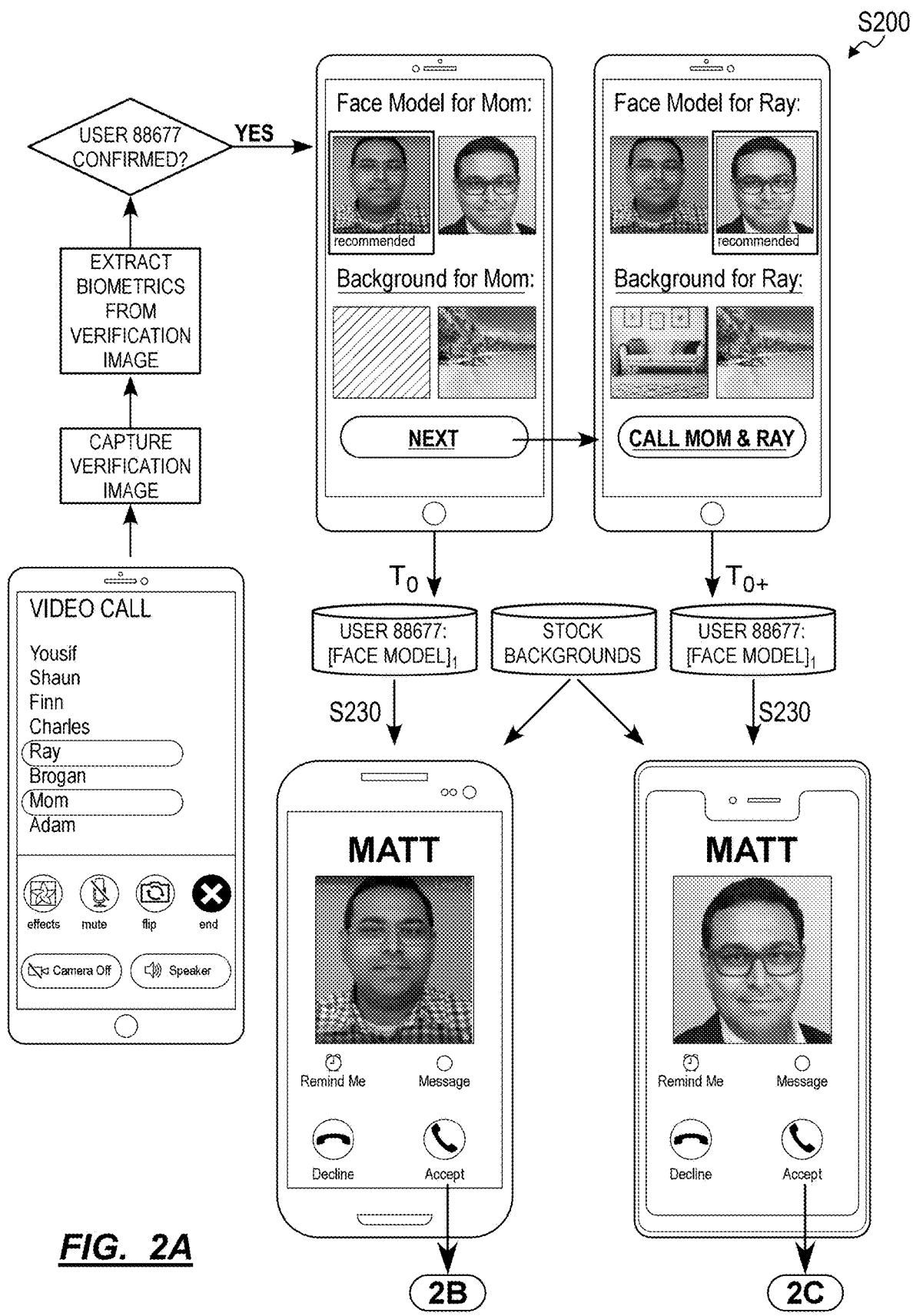
FIGS. 2A-2D are flowchart representations of a second method.

The device (or the remote computer system) can execute the foregoing methods and techniques to generate a face model and a set of look models for the user and to associate this face model and these look models with the user, such as by storing this face model and these look models in the user's account, as shown in FIGS. 2A and 5.

In one variation, the device also prompts the user to associate each look model with a particular contact or group of contacts. For example, the device can execute the foregoing process to generate: a first look model based on a first look image depicting the user as clean-shaven, clean-cut, without a hat, and wearing a tie; a second look model based on a third look image depicting the user as clean-shaven, clean-cut, without a hat, and without a tie; a third look model based on a third look image depicting the user with a beard and wearing a hat; and a fourth look model based on a fourth look image depicting the user with a beard, longer hair, and wearing facial piercings. In this example, the device can interface with the user: to associate the first look model with a first group of work-related contacts; to associate the second look model with a second group of contacts including the user's grandparents and extended family; to associate the third look model with a third group of contacts including the user's parents and siblings; and to associate the fourth look model with a fourth group of contacts including the user's closet friends, spouse, and children.

However, the device (and/or the remote computer system) can generate a set of face and look models and associate these face and look models within individual contacts or groups of contacts in any other way.

2.4.5 Security

When generating a face model based on an image or video clip of the user, the device (or the remote computer system) extracts biometric data (e.g., a "faceprint") from the image or video clip and associates these biometric data with the face model. Later, the device enables a second device to access this face model of the user during a video call only after positively matching biometric data extracted from a video frame captured by the device during this video call to biometric data associated with the face model, such as described below.

Additionally or alternatively, when the user supplies a look image for generation of a look model, the device (or the remote computer system) can: extract biometric data from the look image; verify correspondence between these biometric data and biometric data associated with the existing face model; and then generate a look model based on the look image and the existing face model only after confirming correspondence between these biometric data. Similarly, the device can verify correspondence between biometric data extracted from a look image and a video clip captured by the device before transforming the look image and this video clip into a look model, as described above.

2.5 Body Model

Figure 2B:
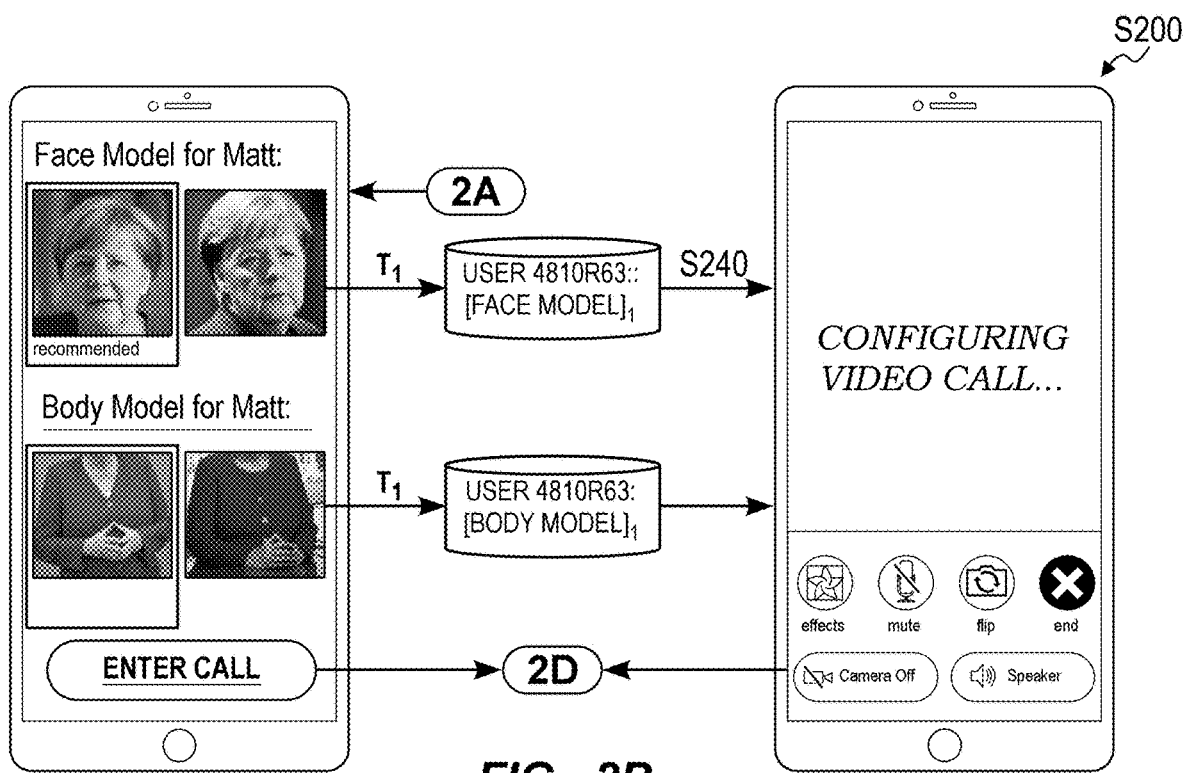

In one variation shown in FIG. 2B, the device (and/or the remote computer system) implements similar methods and techniques to generate a body model for the user.

In this variation, the device (and/or the remote computer system) can implement a body landmark extractor to detect a body in a region of an image (e.g., a photographic image, a frame in a video clip, and/or a frame in a live video feed); to scan this region of the image for features analogous to predefined body landmark types; and to represent location, orientations, and/or sizes, etc. of these analogous features—detected in the region of the image—in one body landmark container. In particular, like the facial deconstruction model and the facial landmark extractor described above, the device and/or the remote computer system can implement the body landmark extractor: to detect spatial characteristics of a body—such as including positions of a neck, shoulders, a chest, arms, hands, an abdomen, a waist—depicted in a 2D image; and to represent these spatial characteristics in a single container (e.g., a vector, a matrix).

Similarly, the device and/or the remote computer system can implement a synthetic body generator to transform a body landmark container—representing a posture of a user detected in an image or frame—and a body model of the user into a synthetic body image, which defines a photorealistic representation of the user's body (e.g., torso, arms) with this same posture. In particular, like the facial reconstruction model and synthetic face generator described above, the device and/or the remote computer system can inject a body landmark container—derived from an original image or frame of a user—and a body model of the user into the synthetic body generator to generate a synthetic body image that may be perceived as (at least) a superficially authentic photorealistic representation of the user's body with the same posture depicted in the original image or frame.

Thus, in this variation, the device (or the remote computer system) can implement methods and techniques similar to those described above to access an individual image, a set of images, and/or a look image of the user. For each image in this set, the device can: detect a body (e.g., neck, shoulders, chest, arms, hands, abdomen, waist) in a region of the image; extract an authentic body image from this region of the image; implement the body landmark extractor to extract a body landmark container from the image; and calculate a set of coefficients that—when injected into the synthetic body generator with the body landmark container—produces a synthetic body image that approximates the authentic body image, such as to a degree that a human may recognize the user's body in the synthetic body image and/or such that a human may discern limited visual differences between the authentic body image and the synthetic body image. The device can then fuse this population of coefficient sets into a body model for the user and store this body model in association with the user, such as linked to the user's account.

The device (or the remote computer system) can also generate multiple body models for the user—such as based on multiple look images depicting the user wearing different garments (e.g., a suit, business casual dress, athletic wear, pajamas)—and link these body models to the user's account. The device can additionally or alternatively link each body model of the user to a correct face or look model generated according to the same image or video clip.

2.5.1 Body Component Model

Additionally or alternatively, rather than generate and manipulate a single body model that represents the user's neck, shoulders, chest, arms, hands, abdomen, and/or waist, etc., the device (and/or the remote computer system) can instead implement similar methods and techniques to generate individual body component models for the user's torso, extremities, and/or other body parts, such as including: a neck model; a chest model; a back model; a left arm model; a right arm model; a left hand model; a right hand model; an abdomen model; a waist model; a left thigh model; a right thigh model; a left shin model; a right shin model; a left foot model; and/or a right foot model.

2.6 Preemptive Model Generation

Generally, the device (and/or the remote computer system) can interface with the user as described above to generate a face model, a set of looks models, and/or a set of body models for the user prior to a video call, such as when a user creates a user account within the application or just prior to (e.g., seconds, minutes before) entering a video call with another user, as shown in FIG. 4.

2.7 Video Call Configuration

When a first user opens the native or browser-based video conferencing application executing on a first device, the first device can interface with the user to configure an upcoming video call with a second user, including selection of a face model, look model, body model, and/or background for representing the first user at the second user's device, as shown in FIGS. 2A and 2B.

2.7.1 Biometric Check

In one implementation shown in FIG. 2A, just before or at the start of the video call, the first device: captures a verification image or a verification video clip of the first user; extracts biometric data from the verification image or verification video clip; and confirms that these extracted biometric data match or sufficiently correspond to biometric data associated with the user's account.

2.7.2 Face/Look Model Selection

Upon confirming this correspondence, the first device can prompt the user to select from a set of available face and look models—associated with the user—for the upcoming video call.

For example, after confirming the identify of the first user based on biometric data extracted from the verification image or verification video clip, the first device can access or generate a synthetic face image for each available face and look model linked to the user's account, such as by injecting a nominal facial landmark container (e.g., representing an average smiling face) and each available face and look model into the synthetic face generator to generate a set of nominal synthetic face images representing this set of face and look models. The first device can then render these synthetic face images within the application and prompt the first user to select a synthetic face image from this set, as shown in FIGS. 2A and 2B.

In this example, the first device can also suggest or recommend a particular face or look model for the video call. For example, if the first user has elected the second user from a contact list or address book and previously associated face and look models in her account with different groups of contacts, the first device can recommend a particular face or look model—from this set of available face and look models—associated with a contact group including the second user.

The first device can then retrieve a face or look model thus selected by the user (e.g., from local memory or from a remote database) and transmit a copy of this face or look model to the second user's device, as shown in FIGS. 2A and 2B. Alternatively, the first device can return this selection to the remote computer system, and the remote computer system can transmit a copy of the corresponding face or look model to the second user's device. Accordingly, the second device can load and store a temporary copy of this face model of the first user for the duration of this video call.

2.7.3 Failed Biometric Check

Conversely, if the first device fails to verify that biometric data extracted from the verification image or verification video clip match or sufficiently correspond to biometric data associated with the first user's account, the first device (and/or the remote computer system) can: disable transmission of a facial landmark container feed from the first device to the second device; and implement methods and techniques described below to generate a new face model or new look model for the first user in (near) real-time based on a video clip captured by the user's device just before or just after the first user enters the video call.

Once the first device (or the remote computer system) generates this new face or look model for the first user, the first device (or the remote computer system) can: transmit this new face or look model to the second device; and activate transmission of a facial landmark container feed from the first device to the second device Alternatively, if the first device fails to verify that biometric data extracted from this verification image or verification video clip match or sufficiently correspond to biometric data associated with the user's account, the first device (and/or the remote computer system) can query a corpus of face and look models stored in a remote database for a subset of face and/or look models associated with biometric data that match or sufficiently correspond to biometric data extracted from the verification image or verification video clip. Upon identifying this subset of face and/or look models, the first device can implement methods and techniques similar to those described above to: present these face and/or look models to the first user, such as by rendering synthetic face images generated according to these face and/or look models; prompt the first user to select from this subset of face and/or look models; and then queue transmission of the selected face or look model to the second device.

2.7.4 Body Model

In one variation in which the first device (or the remote computer system) previously generated a body model of the first user and linked this body model to the first user's account, the first device can also queue transmission of this body model to the second device, such as after verifying an identity of the first user.

Alternatively, in this variation, if the user's account contains multiple body models and multiple face or look models, the first device can select a particular body model linked to the face or look model selected by the user for this video call and queue transmission of this body model to the second device. Yet alternatively, if the user's account contains multiple body models, then the first device can: prompt the user to select from this set of body models, such as by rendering synthetic body images generated according to these available body models; and then queuing transmission of a body model—thus selected by the first user—to the second device, as shown in FIG. 2B.

2.7.5 Background Selection

In one variation, the first device also prompts the first user to elect a background for the video call.

For example, the first device can access a corpus of preexisting static and dynamic (e.g., animated) backgrounds, such as including: solid background colors (e.g., white, gray, yellow); background patterns (e.g., a television test pattern, a brocade pattern, a chevron patter); a stock image (e.g., a stock conference room image, a stock outdoor image, a stock beach image); and/or a stock video clip (e.g., a stock video clip of a beach with waves crashing in a background). In this example, the first device prompts the first user to select from this corpus of preexisting static and dynamic (e.g., animated) backgrounds for the video call, as shown in FIGS. 2A and 2B.

In this example, the first device can also enable the user to upload a background image, such as a photographic image of the user's office, living room, or favorite space. Additionally or alternatively, the first device can extract a background from a look image previously provided by the user or from the verification image or verification video clip captured before the start of the video call and enable the user to select this background for the duration of the video call.

Upon selection of the background by the first user, the first device can transmit a copy of the background to the second device or otherwise queue the second device to load this background.

2.7.6 Second Device

Therefore, prior to initiating a video call with the second device, the first device can interface with the first user to select a face or look model of the first user, a body model of the first user, and/or a background for her synthetic video feed, which together define how the first user is visually presented to the second user during the video call. Prior to entering or at the start of the video call, the second device can access or download local copies of the selected face or look model of the first user (hereinafter the "first face model"), the selected body model of the first user (hereinafter the "first body model"), and/or the background selected by the first user (hereinafter the "first background"), as shown in FIG. 2A. More specifically, prior to the video call, the first device (or the remote computer system) can automatically grant the second device permission to securely download the first face model, etc. selected by the first user.

Concurrently and prior to entering the video call, the second device can interface with the second user to select a face or look model of the second user, a body model of the second user, and/or a background for her synthetic video feed during the video call, which together define how the second user is visually presented to the first user during the video call, as shown in FIG. 2B. Prior to entering or at the start of the video call, the first device can access or download local copies of the selected face or look model of the second user (hereinafter the "second face model"), the selected body model of the second user (hereinafter the "second body model"), and/or the background selected by the second user (hereinafter the "second background"). More specifically, prior to the video call, the second device (or the remote computer system) can automatically grant the first device permission to securely download the first face model, etc. selected by the second user.

2.8 Variation: Real-Time Face Model/Look Model Generation

Figure 2C:
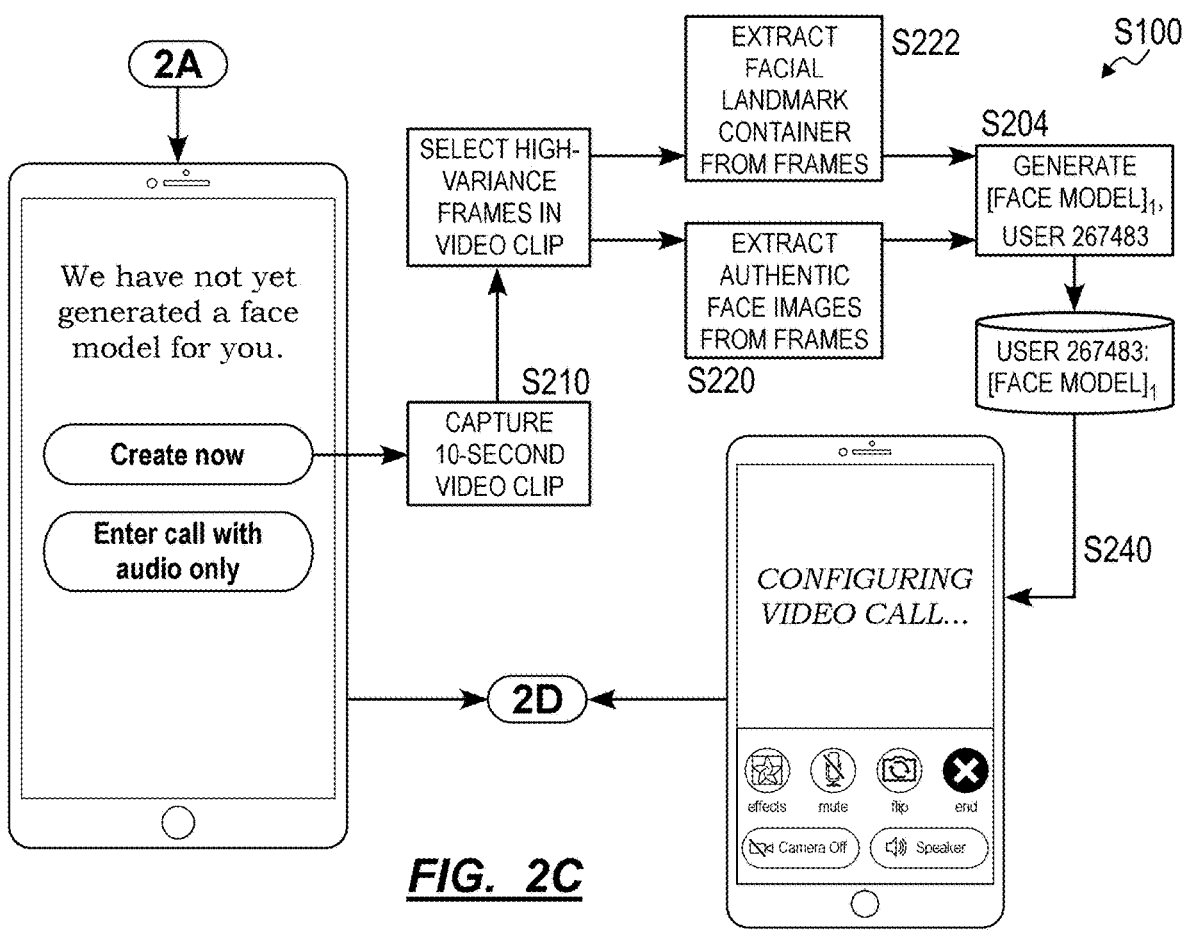

In one variation shown in FIG. 2C, if a face model of the first user is not available upon selection of a video call with the second user (or if a look model that the first user prefers for this video call is not available), the first device (and/or the remote computer system) can: enable transmission of a first audio feed to the second device; disable transmission of a facial landmark container to the second device (and therefore disable generation of a synthetic video feed of the first user at the second device); capture a video clip of the first user; (access a look image uploaded by the first user); and implement methods and techniques described above to generate a new face model (or a new look model) for the first user based on the video clip (and the look image). Upon generating a new face model (or a new look model) for the first user, such as approximately one minute later, the first device can: return the new face model (or the new look model) to the second device; link the new face model (or the new look model) to the first user's account; and enable transmission of a facial landmark container from the first device to the second device (and therefore enable generation of a synthetic video feed of the first user at the second device).

In this variation, the first device can also execute this process to generate a new face model (or a new look model) in real-time during the video clip when manually triggered by the first user. The first device can then queue the second device to download a copy of this new face model (or new look model) during the video call. Upon receipt of this new face model (or new look model), the second device can implement this new face model (or new look model)—rather than a second face model previously selected by the first user for this video call—to transform facial landmark containers received from the first device into synthetic face images of the first user.

2.8.1 Real-Time Body Model Generation

In this variation, the first device can implement similar methods and techniques to generate a new body model for the user in (near) real-time based on a video clip captured by the first device at the start of the video call.

However, the first device can implement any other methods or techniques to configure an upcoming or current video call with a face model, body model, and/or background selected by the first user and to serve these data to the second device; and vice versa.

2.9 Video Call

Then, during the video call, the first device can: capture a first video feed in Block S210; implement a local copy of the facial landmark extractor to represent constellations of facial landmarks—detected in the first video feed—in a first feed of facial landmark containers in Block S222; and transmit the first feed of facial landmark containers to the second device in Block S230. Upon receipt, the second device can: transform the first feed of facial landmark containers and a local copy of the first face model of the first user into a first feed of synthetic face images according to the synthetic face generator in Block S250; and render the first feed of synthetic face images over the first background in Block S252, shown in FIG. 2D.

Concurrently, the second device can: capture a second video feed in Block S210; implement a local copy of the facial landmark extractor to represent constellations of facial landmarks—detected in the second video feed—in a second feed of facial landmark containers in Block S222; and transmit the second feed of facial landmark containers to the first device in Block S230. Upon receipt, the first device can: transform the second feed of facial landmark containers and a local copy of the second face model of the second user into a second feed of synthetic face images according to the synthetic face generator in Block S250; and render the second feed of synthetic face images over the second background in Block S252, shown in FIG. 2D.

2.9.1 Facial Landmark Container Feeds

In particular, in preparation for the video call, the first device can: load local copies of the synthetic face generator, the facial landmark extractor, the second face model of the second user, and the second background selected by the second user. During the video call, the first device can: capture a first audio feed; compress the first audio feed into a first feed of audio packets; capture a first video feed; compress the first video feed into a first facial landmark container feed; and stream the first feed of audio packets and the first facial landmark container feed to the second device in near real-time (e.g., with a maximum time of 50 milliseconds from capture to upload).

For example, for a first video frame in the first video feed, the first device can implement the facial landmark extractor to: detect the first user's face in a first region of the first video frame; detect positions of facial landmarks in the first region of the first video frame; and generate a first facial landmark container that represents positions of these facial landmarks in the first region of the first video frame. The first device can then upload the first facial landmark container with a first audio packet—captured around (e.g., within 50 milliseconds of) a capture time of the first video frame—to a computer network, which distributes the first facial landmark container and the first audio packet to the second device.

Then, for a second (e.g., next) video frame in the first video feed, the first device can: implement face tracking or object tracking techniques to track the first user's face from the first region in the first frame to a second region in the second video frame; and implement the facial landmark extractor to generate a second facial landmark container that represents positions of facial landmarks in the second region of the second video frame. The first device can then upload the second facial landmark container with a second audio packet—captured around a capture time of the second video frame—to the computer network, which distributes the second facial landmark container and the second audio packet to the second device.

Concurrently, the second device can implement similar methods and techniques to stream a second feed of audio packets and a second facial landmark container feed to the first device.

2.9.2 Synthetic Face Image Feeds

During the video call, the second device renders the first background in a video call portal within a second instance of the application executing on the second device.

Upon receipt of a facial landmark container and a corresponding audio packet from the first device, the second device can: extract audio data from the audio packet; insert the facial landmark container and the first face model of the first user into a local copy of the synthetic face generator—stored in local memory on the second device—to generate a synthetic face image; and render the synthetic face image over the first background within the video call portal (e.g., to form a "first synthetic video feed") while playing back the audio data via an integrated or connected audio driver.

By repeating this process for each audio packet and facial landmark container received from the first device during the video call, the second device can thus generate and render a first synthetic video feed depicting the first user's face over the first background—synchronized to playback of an audio stream from the first device—in near real-time (e.g., with less than one second of latency).

The first device can implement similar methods and techniques during the video call to generate and render a second synthetic video feed depicting the second user's face over the second background—synchronized to playback of an audio stream from the second device—in near real-time.

2.9.3 Variation: Synthetic Body Image Feeds

Figure 2D:
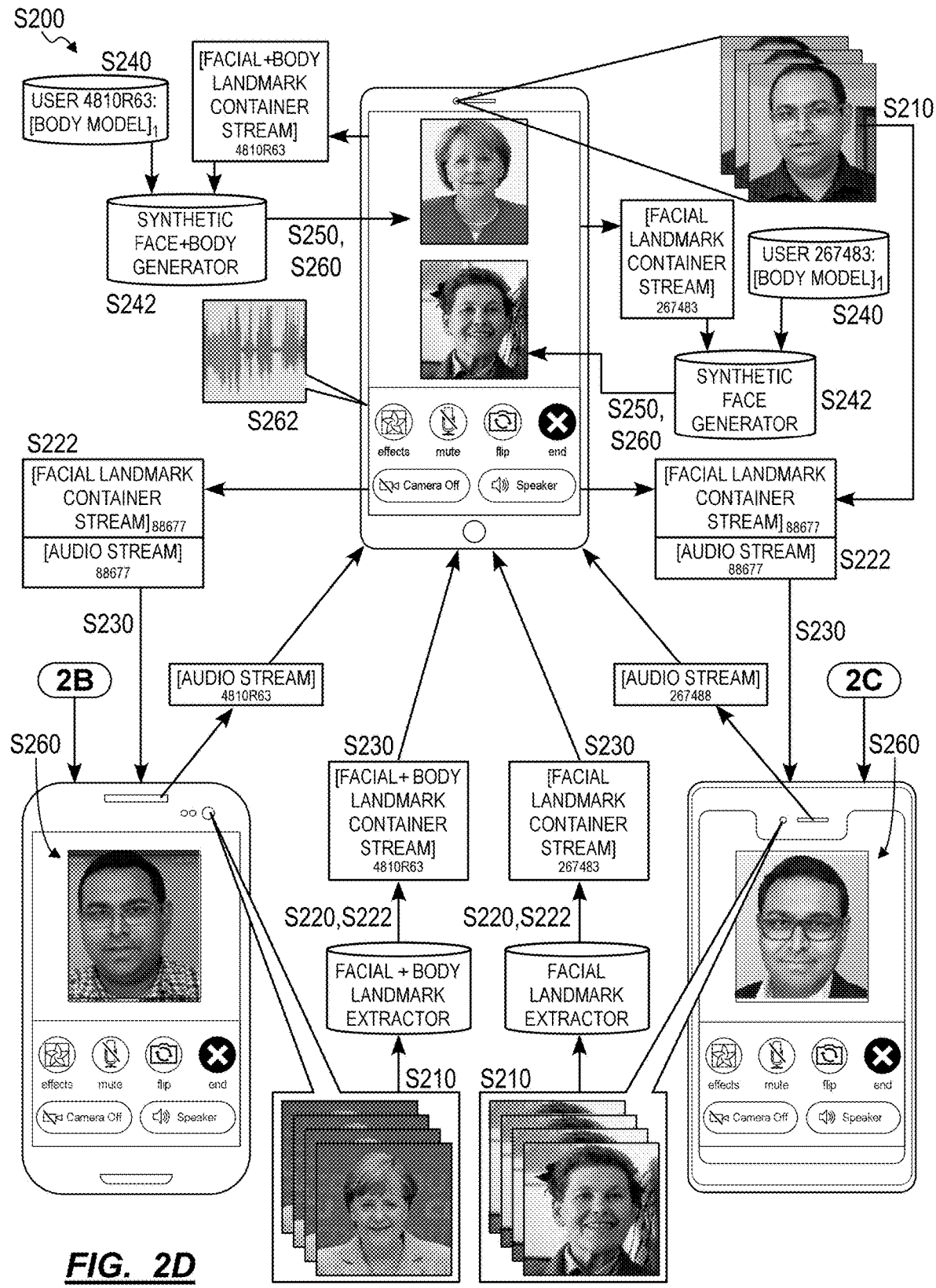

In one variation shown in FIG. 2D, the first device similarly: detects the first user's body in the first video feed; transforms the first video feed into a first feed of body landmark containers; and streams this first feed of body landmark containers to the second device. In this variation, the second device can then implement similar methods and techniques: to inject the first body model and each subsequent body landmark container received from the first device into a local copy of the synthetic body generator—stored in local memory on the second device—to generate a first stream of synthetic body images of the first user; and to then render this first stream of synthetic body images—with the first stream of synthetic face images of the first user—over the first background while playing back the first audio stream received from the first device.

In this variation, the second device can thus generate and render a first synthetic video feed—representing an authentic depiction of the first user's face, body, facial expressions, and body posture—over the first background in near real-time during the video call.

Similarly, in this variation, the first device can generate and render a second synthetic video feed—representing an authentic depiction of the second user's face, body, facial expressions, and body posture—over the second background in near real-time during the video call.

2.9.4 Internal Synthetic Face Image Feed

In one variation, the first device can implement similar methods and techniques to locally generate a first synthetic video feed of the first user and to render this first synthetic video feed within the video call portal within the first instance of the application executing on the first device, thereby enabling the first user to visualize how she is seen by the second user during the video call.

For example, during the video call, the first device can render the first background—adjacent the second background—in the video call portal within the first instance of the application executing on the second device. Upon extraction of a facial landmark container from a next frame in the first video feed, the first device can: insert the facial landmark container and the first face model of the first user into a local copy of the synthetic face generator—stored in local memory on the first device—to generate a synthetic face image; and render the synthetic face image over the first background within the video call portal while concurrently rendering a second synthetic face image of the second user over the second background.

2.9.5 Video Call Conclusion

Then, upon conclusion of the video call, the first device can delete local copies of the second face model, the second body model, and/or the second background; and the second device can similarly delete local copies of the first face model, the first body model, and/or the first background.

2.10 Variation: Third Synthetic Video Feed

In one variation, the first device detects a third face in the first video feed during the video call and selectively enables or mutes synthesis of images of the third face at the second device based on whether the first user confirms representation of the third face at the second device and/or whether a face model of the third face is available.

2.10.1 Third User Detection

In one implementation, the first device implements face detection techniques to detect discrete faces in the first video feed. Upon detecting a first face in the first video feed, the first device can: extract a first set of biometric data for the first face from the first video feed; identify the first user based on this first set of biometric data; generate a first feed of facial landmark containers for the first face; and stream this first feed of facial landmark containers—with a link to or other association with the first face model—to the second device for reconstruction into synthetic face images of the first user according to the first face model.

However, upon detecting a third face in the first video feed, the first device can prompt the first user at the first device to confirm representation of the third user in a first synthetic video feed generated and rendered at the second device. Then, if the first user declines representation of the third user in the first synthetic video feed at the second device, the first device can: continue to track the third face in the first video feed in order to distinguish the first and third faces in the first video feed; and withhold generation and transmission of a third feed of facial landmark containers for the third face.

2.10.2 Third User Video Feed Confirmed

Alternatively, if the first user confirms representation of the third user in the first synthetic video feed at the second device, the first device (or the remote computer system) can execute methods and techniques described above to extract a third set of biometric data for the third face from the first video feed and to compare this third set of biometric data to biometric data affiliated with the first user's account. In response to failing to match the third set of biometric data to biometric data stored in the first user's account, the first device can scan secondary user accounts affiliated with the first user (e.g., a second account associated with the first user's spouse, children, parents, or calibration object-workers) for biometric data that match the third set of biometric data.

In response to failing to match the third set of biometric data to biometric data affiliated with these secondary accounts, the first device can scan others accounts—such as a population of user accounts stored in a remote database—for biometric data that match the third set of biometric data.

2.10.3 Third User Identified

Upon successfully identifying the third face as a third user, the first device (or the remote computer system) can prompt selection of a face model or a look model associated with the third user.

The first device can then: trigger the second device to load the third face model—selected for the third user at the first device—such as from a remote database of face models; track the third user's face in the first video feed; extract a third feed of facial landmark containers for the third user's face from the first video feed; and stream this third feed of facial landmark containers to the second device.

The second device can then implement methods and techniques described above: to inject the third face model and the third feed of facial landmark containers into the synthetic face generator to generate a third feed of synthetic face images; and to render this third feed of synthetic face images—adjacent the first feed of synthetic face images—over the first background.

2.10.4 Third User Not Identified

Conversely, if the first device (or the remote computer system) fails to successfully identify the third user but the first (or third) user confirms representation of the third user in the first synthetic video feed at the second device, the first device (or the remote computer system) can implement methods and techniques described above to automatically: extract a set of authentic face images of the third face from the first video feed; generate a new face model for the third face based on this set of authentic face images; and transmit the new face model for the third face to the second device. Throughout the process, as the first device (or the remote computer system) generates this new face model for the third face, the first device can stream a live video feed to the second device, which the second device can render directly. Once the first device (or the remote computer system) generates this new face model for the third face, the first device can transition to streaming feeds of facial landmark containers for the first and third faces to the second device. The second device can then: implement face models for the first and third faces and these facial landmark container feeds to generate first and third synthetic face image feeds; and render these first and third synthetic face image feeds over the first background.

Alternatively, as the first device (or the remote computer system) generates this new face model for the third face, the first device can generate and stream both the first and third facial landmark container feeds to the second device. The second device can: transform the first face model for the first user and the first feed of facial landmark containers into a first synthetic face image feed that mimics the first user's face depicted in the first video feed; and render this first synthetic face image feed over the first background. Concurrently, the second device can: implement a generic face model (e.g., for a cartoon character, a cat, a dog, a mouse) to transform the third feed of facial landmark containers into a third synthetic face image feed that mimics a generic face (e.g., the cartoon character, the cat, the dog, the mouse); and render this third synthetic face image—adjacent the first synthetic face image feed—over the first background. In this implementation, once the first device (or the remote computer system) generates this new face model for the third face, the second device can download this new face model and transition to generating the third synthetic face image feed according to this new face model rather than the generic face model.

2.10.5 Third Face Model Preservation

Upon conclusion of the video call, the first and second devices can delete and discard the new face model for the third face.

Alternatively, the first device can prompt the first user to link the new face model to her account, thereby enabling the first device to quickly identify the third user, retrieve this new face model for the third user, and support generation of a synthetic video feed depicting both the first user and third user during a future video call with another device. Then, if the first user confirms this option, the first device (or the remote computer system) can generate a secondary account for the third user and store the new face model in the secondary account.

However, the first device, the second device, and/or the remote computer system can implement any other method or technique to generate feeds of facial landmark containers for multiple faces depicted in a video feed and to simultaneously reconstruct these feeds of facial landmark containers into a synthetic video feed containing photorealistic representations of these multiple faces, including the appearances, facial expressions, and relative positions of the faces depicted in the original video feed.

2.11 Multi-Party Video Call

In another variation shown in FIGS. 2A-2D, a multiple devices—such as including the first device, the second device, and a third device, etc.—concurrently execute the foregoing methods and techniques to host a multi-party video call in which each device in the video call transmits a feed of facial landmark containers to other devices in the video call and generates and renders synthetic face images based on facial landmark container feeds and face models received from these other devices in the video call.

In one implementation, the first and second devices similarly transmit first and second facial landmark container feeds to a third device during a video call. The third device can then implement the first and second face models for the first and second users to concurrently transform the first and second facial landmark container feeds into first and second synthetic face image feeds and then concurrently render these first and second synthetic face image feeds during the video call. The first device can implement similar methods and techniques to generate and render second and third synthetic face image feeds based on second and third face models of the second and third users and based on facial landmark container feeds received from the second and third devices. The second device can further implement these methods and techniques to generate and render first and third synthetic face image feeds based on the first and third face models and based on facial landmark container feeds received from the first and third devices.

In this variation, the first user may also elect different face or look models, body models, and/or backgrounds to distribute to other devices within the multi-party video call such that these devices generate synthetic video feeds depicting the first user with the same facial expressions and face pose but with different skin tone, facial hair, makeup, hair style, jewelry, and/or clothing, etc. in different spaces throughout the video call, as shown in FIGS. 2A-2D.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a human annotator computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method for video conferencing comprising:
during a setup period:
accessing a target image of a first user;
detecting a target face in the target image;
representing a target constellation of facial landmarks, detected in the target image, in a target facial landmark container;
generating a target set of face model coefficients;
transforming the target facial landmark container and the target set of face model coefficients into a target synthetic face image according to a synthetic face generator;
characterizing a difference between the target synthetic face image and the target face detected in the target image;
adjusting the target set of face model coefficients to reduce the difference; and
generating a first face model, associated with the first user, based on the target set of face model coefficients;
at a first device associated with a first user:
capturing a first video feed;
for a first frame, in the first video feed, captured at a first time:
detecting a first constellation of facial landmarks in the first frame; and
representing the first constellation of facial landmarks in a first facial landmark container; and
transmitting the first facial landmark container and a first audio packet, captured at approximately the first time, to a second device; and
at the second device associated with a second user:
accessing a first face model representing facial characteristics of the first user;
accessing a synthetic face generator;
transforming the first facial landmark container and the first face model into a first synthetic face image according to the synthetic face generator;
rendering the first synthetic face image at a second time; and
outputting the first audio packet at approximately the second time.

2. The method of claim 1:
further comprising, at the first device:
capturing a first audio segment over a first duration spanning the first time; and
compressing the first audio segment into the first audio packet;
wherein rendering the first synthetic face image at the second device comprises rendering the first synthetic face image at the second time, within 500 milliseconds of the first time, at the second device; and
wherein outputting the first audio packet at the second device comprises:
extracting a first audio clip from the first audio packet; and
outputting the first audio clip, over a second duration spanning the second time, at the second device.

3. The method of claim 1, further comprising:
at the first device:
for a second frame, in the first video feed, captured at a third time succeeding the first time:
detecting a second constellation of facial landmarks in the second frame; and
representing the second constellation of facial landmarks in a second facial landmark container; and
transmitting the second facial landmark container and a second audio packet, captured at approximately the third time, to the second device; and at the second device:
   transforming the second facial landmark container and the first face model into a second synthetic face image according to the synthetic face generator;
   rendering the second synthetic face image, in replacement of the first synthetic face image, at a fourth time succeeding the second time; and
   outputting the second audio packet at approximately the fourth time.

4. The method of claim 1, further comprising:
at the second device:
   capturing a second video feed;
   for a second frame, in the second video feed, captured at approximately the first time:
      detecting a second constellation of facial landmarks in the second frame; and
      representing the second constellation of facial landmarks in a second facial landmark container; and
   transmitting the second facial landmark container to the first device;
at the first device:
   accessing a second face model representing facial characteristics of the second user;
   accessing the synthetic face generator;
   transforming the second facial landmark container and the second face model into a second synthetic face image according to the synthetic face generator; and
   rendering the second synthetic face image at approximately the second time.

5. The method of claim 1, further comprising:
at a third device associated with a third user:
   capturing a third first video feed;
   for a third frame, in the third first video feed, captured at approximately the first time:
      detecting a third constellation of facial landmarks in the third frame; and
      representing the third constellation of facial landmarks in a third facial landmark container; and
   transmitting the second facial landmark to the second device; and
at the second device:
   accessing a third face model representing facial characteristics of the third user;
   transforming the third facial landmark container and the third face model into a third synthetic face image according to the synthetic face generator; and
   rendering the third synthetic face image, adjacent the first synthetic face image, at the second time.

6. The method of claim 1:
further comprising
   at the first device, receiving selection of a first background image; and
   at the second device, loading a local copy of the first background image; and
wherein rendering the first synthetic face image at the second device comprises rendering the first synthetic face image, overlayed over the local copy of the first background image, at the second time.

7. The method of claim 1, wherein detecting the first constellation of facial landmarks in the first frame comprises:
   detecting a face in a first region of the first frame;
   initializing the first facial landmark container comprising a first vector; and
   for each facial landmark type in a predefined set of facial landmark types:
      scanning the first region of the first frame for features analogous to the facial landmark type;
      in response to detecting a feature analogous to the facial landmark type, extracting a location of the feature in the first frame; and
      writing the location of the feature, extracted from the first frame, to a position in the first vector corresponding to the facial landmark type.

8. The method of claim 1, wherein representing the target constellation of facial landmarks in the target facial landmark container comprises:
   initializing the target facial landmark container;
   for each facial landmark type in a predefined set of facial landmark types:
      scanning the target image for features analogous to the facial landmark type;
      in response to detecting a feature analogous to the facial landmark type, characterizing a position of the feature in the target image; and
      representing the position of the feature in the target facial landmark container.

9. The method of claim 8:
further comprising:
   accessing a video clip of the user; and
   for each frame in a set of frames in the video clip:
      detecting the face in a secondary region of the frame;
      characterizing positions of a secondary set of features, analogous to facial landmark types in the predefined set of facial landmark types, detected in the secondary region of the frame;
      representing positions of the secondary set of features in a secondary facial landmark container;
      defining a secondary set of face model coefficients;
      transforming the secondary facial landmark container and the secondary set of face model coefficients into a secondary synthetic face image according to the synthetic face generator;
      characterizing a secondary difference between the secondary synthetic face image and the secondary region of the frame depicting the face; and
      adjusting the secondary set of face model coefficients to reduce the secondary difference; and
wherein generating the first face model comprises calculating the first face model based on a combination of:
   the target set of face model coefficients; and
   secondary sets of face model coefficients associated with the set of frames.

10. The method of claim 9:
wherein accessing the target image comprises accessing the target image representing a physiognomy preferred by the first user;
further comprising:
   assigning a target weight to the target set of face model coefficients; and
   for each frame in the set of frames in the video clip, assigning a secondary weight, less than the target weight, to the secondary set of face model coefficients associated with the frame; and
wherein generating the first face model comprises calculating the first face model based on a combination of:
   the target set of face model coefficients weighted according to the target weight; and
   the secondary set of face model coefficients, weighted according to secondary weights, associated with the set of frames.

11. The method of claim 1:
further comprising, during the setup period:
accessing a video clip of the user captured by the first device during a video call setup period preceding the first time; and
for each frame in a set of frames in the video clip:
detecting a face in a region of the frame;
characterizing positions of a second set of features, analogous to facial landmark types in a predefined set of facial landmark types, in the region of the frame;
representing positions of the second set of features in a second facial landmark container;
defining a second set of face model coefficients;
transforming the second facial landmark container and the second set of face model coefficients into a second synthetic face image according to the synthetic face generator;
characterizing a second difference between the second synthetic face image and the region of the frame depicting the face; and
adjusting the second set of face model coefficients to reduce the second difference; and
wherein generating the first face model comprises generating the first face model further based on a combination of second sets of face model coefficients associated with the set of frames; and
wherein accessing the first face model at the second device comprises loading a temporary copy of the first face model onto the second device during the video call setup period.

12. The method of claim 11:
further comprising, for each frame in the set of frames in the video clip:
for a first coefficient in the second set of face model coefficients associated with the frame:
characterizing sensitivity of the second difference to the first coefficient; and
assigning a first weight to the first coefficient proportional to the sensitivity; and
wherein generating the first face model comprises:
calculating a first combination of first coefficients, in the target set of face model coefficients and the second sets of face model coefficients, according to first weights assigned to first coefficients in the target set of face model coefficients and the second sets of face model coefficients; and
storing the first combination of first coefficients in the first face model.

13. The method of claim 1:
further comprising:
storing the first face model, associated with the first user, in a database of face models; and
following the setup period:
accessing an initial frame captured by the first device prior to the first time;
extracting a set of biometric verification data from the initial frame;
identifying the first user based on the set of biometric verification data; and
in response to identifying the first user based on the set of biometric verification data, prompting the first user to select a face model from a subset of face models, stored in the database of face models, associated with the first user; and
wherein accessing the first face model at the second device comprises loading a temporary copy of the first face model onto the second device prior to the first time in response to selection of the first face model, from the database of face models, by the first user.

14. The method of claim 1:
further comprising:
at the first device, receiving selection of the first face model, from a set of face models associated with the first user, by the first user prior to the first time; and
wherein accessing the first face model at the second device comprises loading a temporary copy of the first face model onto the second device prior to the first time according to selection of the first face model by the first user.

15. The method of claim 14:
further comprising:
associating the first face model with a first group of contacts;
associating a second face model, in the set of face models of the user, with a second group of contacts; and
in response to first group of contacts comprising the second user, serving a recommendation to the first user to elect the first face model, from the set of face models of the user, for a video call with the second user; and
wherein receiving selection of the first face model at the first device comprises, at the first device, receiving confirmation of the first face model for the video call with the second user.

16. The method of claim 1, further comprising:
at the first device:
detecting a first constellation of body landmarks in the first frame; and
representing the first constellation of body landmarks in a first body landmark container; and
transmitting the first body landmark container, with the first facial landmark container, to the second device; and
at the second device:
accessing a first body model representing corporeal characteristics of the first user;
accessing a synthetic body generator;
transforming the first body landmark container and the first body model into a first synthetic body image according to the synthetic body generator; and
rendering the first synthetic body image, aligned with the first synthetic face image, at the second time.

17. A method comprising:
during a setup period:
accessing a photographic image depicting a first user;
generating a first face model, representing facial characteristics of the first user, based on features detected in the photographic image; and
storing the first face model in a database of face models;
at a first device associated with the first user:
receiving a selection of the first face model, in the database of face models, from the first user;
capturing a first video feed;
representing constellations of facial landmarks, detected in the first video feed, in a first feed of facial landmark containers; and
transmitting the first feed of facial landmark containers to a second device; and
at the second device associated with a second user:
accessing the first face model based on the selection of the first face model at the first device;

accessing a synthetic face generator;

transforming the first feed of facial landmark containers and the first face model into a first feed of synthetic face images according to the synthetic face generator; and rendering the first feed of synthetic face images.

18. The method of claim 17:

wherein representing constellations of facial landmarks, detected in the first video feed, in the first feed of facial landmark containers comprises:

in a first frame in the first video feed:

detecting a first face in a first region of the first frame;

identifying the first face as the first user;

detecting a first constellation of facial landmarks in the first frame; and representing the first constellation of facial landmarks in a first facial landmark container; and in a second frame, succeeding the first frame, in the first video feed:

tracking the first face from the first region of the first frame to a second region of the second frame;

detecting a second constellation of facial landmarks in the second frame; and representing the second constellation of facial landmarks in a second facial landmark container; and wherein transmitting the first feed of facial landmark containers to the second device comprises streaming the first facial landmark container followed by the second facial landmark container to the second device.

19. The method of claim 17:

further comprising:

accessing a first frame in the first video feed;

extracting a set of biometric verification data from the initial frame;

identifying the first user based on the set of biometric verification data; and in response to identifying the first user, enabling the second device to access the first face model associated with the first user; and wherein accessing the first face model at the second device comprises loading a temporary copy of the first face model onto the second device.

20. A method comprising:

during a setup period:

accessing a first video feed captured by a first device interfacing with the first user; and generating a first face model, representing facial characteristics of a first user depicted in the first video feed, based on features in the first video feed;

at the first device:

capturing a second video feed;

representing constellations of facial landmarks, detected in the second video feed, in a first feed of facial landmark containers; and transmitting the first feed of facial landmark containers to a second device; and at the second device interfacing with a second user:

accessing the first face model;

accessing a synthetic face generator;

transforming the first feed of facial landmark containers and the first face model into a first feed of synthetic face images according to the synthetic face generator; and rendering the first feed of synthetic face images.

21. The method of claim 20, wherein capturing the second video feed comprises, at the first device, capturing the second video feed contiguous with and succeeding the first video feed.

22. The method of claim 20:

further comprising, during the setup period, accessing a prerecorded photographic image depicting the first user and recorded prior to the setup period; and wherein generating the first face model comprises generating the first face model further based on features detected in the prerecorded photographic image.

* * * * *